US012735531B2

(12) United States Patent
Kim et al.

(10) Patent No.: US 12,735,531 B2
(45) Date of Patent: Sep. 15, 2026

(54) POLYPHENYLENE ETHER, PRODUCTION METHOD OF THE SAME, THERMOSETTING COMPOSITION, PREPREG, AND LAMINATE

(71) Applicant: ASAHI KASEI KABUSHIKI KAISHA, Tokyo (JP)

(72) Inventors: Jaehoon Kim, Tokyo (JP); Shinichi Fukuen, Tokyo (JP); Kazuto Nagata, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 484 days.

(21) Appl. No.: 18/548,536

(22) PCT Filed: Dec. 15, 2021

(86) PCT No.: PCT/JP2021/046373
§ 371 (c)(1),
(2) Date: Aug. 31, 2023

(87) PCT Pub. No.: WO2022/190497
PCT Pub. Date: Sep. 15, 2022

(65) Prior Publication Data

US 2024/0166812 A1 May 23, 2024

(30) Foreign Application Priority Data

Mar. 10, 2021 (JP) ................................. 2021-038318

(51) Int. Cl.
*C08G 18/48* (2006.01)
*C08G 65/44* (2006.01)
*C08G 65/48* (2006.01)
*C08J 5/24* (2006.01)

(52) U.S. Cl.
CPC ............. *C08G 65/44* (2013.01); *C08G 65/48* (2013.01); *C08G 65/485* (2013.01); *C08J 5/244* (2021.05); *C08J 2371/12* (2013.01)

(58) Field of Classification Search
CPC ....... C08G 65/44; C08G 65/48; C08G 65/485
See application file for complete search history.

(56) References Cited

U.S. PATENT DOCUMENTS 3,496,236 A 2/1970 Cooper et al.
4,309,513 A 1/1982 Ueno et al.
4,801,645 A 1/1989 Nishio et al.
5,880,221 A 3/1999 Liska et al.
9,012,572 B2 4/2015 Lin et al.
2005/0070685 A1 3/2005 Mitsui et al.
2006/0041086 A1 2/2006 Birsak et al.
2008/0171817 A1 7/2008 Peters et al.
2009/0018303 A1 1/2009 Onizuka et al.
2014/0323666 A1 10/2014 Lin et al.
2015/0141610 A1 5/2015 Fung et al.
2018/0312683 A1* 11/2018 Umehara .............. C08F 222/10
2019/0002637 A1 1/2019 Orimo et al.
2021/0024695 A1 1/2021 Fukuoka et al.

FOREIGN PATENT DOCUMENTS

| | | | |
|---|---|---|---|
| EP | 0052854 | A1 | 6/1982 |
| JP | S4969797 | A | 7/1974 |
| JP | S56104935 | A | 8/1981 |
| JP | S56104961 | A | 8/1981 |
| JP | S5744625 | A | 3/1982 |
| JP | S5787454 | A | 5/1982 |
| JP | S57149351 | A | 9/1982 |
| JP | 2001040088 | A | 2/2001 |
| JP | 2002030145 | A | 1/2002 |
| JP | 2003261674 | A | 9/2003 |
| JP | 2004099824 | A | 4/2004 |
| JP | 2004339328 | A | 12/2004 |
| JP | 2007070598 | A | 3/2007 |
| JP | 2007308685 | A | 11/2007 |
| JP | 2008510059 | A | 4/2008 |
| JP | 2015101727 | A | 6/2015 |
| TW | I612072 | B | 1/2018 |
| WO | 2007097231 | A1 | 8/2007 |
| WO | 2019189829 | A1 | 10/2019 |

OTHER PUBLICATIONS

Sep. 12, 2023, International Preliminary Report on Patentability issued in the International Patent Application No. PCT/JP2021/046373.
Jul. 29, 2024, the Supplementary European Search Report issued by the European Patent Office in the corresponding European Patent Application No. 21930342.7.
Mar. 8, 2022, International Search Report issued in the International Patent Application No. PCT/JP2021/046373.

* cited by examiner

*Primary Examiner* — Michael L Leonard
(74) *Attorney, Agent, or Firm* — KENJA IP LAW PC

(57) ABSTRACT

A polyphenylene ether includes a repeating unit derived from a phenol of the formula (1), a repeating unit derived from a phenol of the formula (2), and a structural unit derived from a phenol of the formula (3).

20 Claims, No Drawings

POLYPHENYLENE ETHER, PRODUCTION METHOD OF THE SAME, THERMOSETTING COMPOSITION, PREPREG, AND LAMINATE

TECHNICAL FIELD

The present disclosure relates to a polyphenylene ether, a production method of the same, a thermosetting composition, a prepreg, and a laminate.

BACKGROUND

Polyphenylene ethers (herein referred to as "PPEs") are excellent in high-frequency characteristics, flame retardancy, and heat resistance, and they are therefore widely used as materials in electric and electronic fields, automotive fields, materials for products and components in the food and packaging fields, and other industrial material fields. In particular, in recent years, their applications as a modifier for electronic materials such as substrate materials or various applications have been studied by utilizing their low dielectric properties and heat resistance.

However, polyphenylene ethers having high molecular weight and repeating units derived from a monovalent phenol such as 2,6-dimethylphenol are generally soluble in highly toxic solvents such as chloroform, but are insoluble in aromatic solvents such as toluene, which are known as good solvents. In addition, they are insoluble in ketone-based solvents such as methyl ethyl ketone. This makes it difficult to handle resin varnish solutions such as toluene and methyl ethyl ketone solutions when used as wiring board materials, for example.

PTL 1 discloses that a polyphenylene ether with a low molecular weight and a specific particle size has excellent solubility in solvents such as methyl ethyl ketone.

In addition, PTL 2 discloses a modified polyphenylene ether compound having a predetermined polyphenylene ether moiety in the molecular structure and having at least one or more p-ethenylbenzyl group, m-ethenylbenzyl group, and the like at a molecular terminal thereof.

Further, PTL 3 discloses a modified polymer having a polyphenylene ether moiety in the molecular structure, and having a methacryl group at a molecular terminal thereof.

For easily assuring a heat resistance of polyphenylene ether used for substrates as in the compounds disclosed in PTL 2 and PTL 3, a method of increasing the crosslinking density between a thermosetting polyphenylene ether and a thermosetting crosslinking agent is effective. To achieve this, a polyfunctional polyphenylene ether having a plurality of terminals in one molecule is required. Hence, PTLs 4, 5, and 6 propose low molecular weight polyfunctional polyphenylene ethers obtained through polymerization in the presence of a polyfunctional phenolic compound. Because such polyfunctional polyphenylene ethers have branched structures, they have lower solution viscosities than linear polymers having the same molecular weight, and have higher fluidity than those of linear polymers having the same molecular weight. Thus, a polymer having a relatively high molecular weight can be used in the curing step, and improvement in physical properties of a cured product can be expected. Further, in addition to the above contribution to an improvement in the physical properties, improved control on a crosslinking reaction can be expected because the numbers of crosslinking reaction sites is increased.

CITATION LIST

Patent Literature

PTL 1: JP 2004-99824 A
PTL 2: JP 2004-339328 A
PTL 3: JP 2008-510059 A
PTL 4: U.S. Pat. No. 9,012,572 B
PTL 5: JP 2007-308685 A
PTL 6: JP 2007-070598 A

SUMMARY

Technical Problem

As mentioned above, literature such as PTL 1 discloses methods for producing polyphenylene ethers and multifunctional polyphenylene ethers of which molecular weight is lowered to improve the solubility of polyphenylene ethers to solvents. However, simply lowering the molecular weights of the polyphenylene ethers does not significantly improve their solubility in general-purpose ketone-based solvents such as methyl ethyl ketone at room temperature, and further improvement is still needed.

The present disclosure was made in view of the above issue, and an object thereof is to provide a polyphenylene ether with excellent solubility in general-purpose ketone-based solvents and a production method of the same. It is also an object thereof to provide a thermosetting composition, a prepreg, and a laminate using the polyphenylene ether.

Solution to Problem

Thus, the present disclosure is as follows.

[1]

A polyphenylene ether comprising a repeating unit derived from a phenol of the following formula (1), a repeating unit derived from a phenol of the following formula (2), and a structural unit derived from a phenol of the following formula (3):

[Chem. 1]

Formula (1)

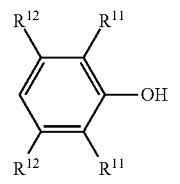

(in the formula (1), each $R^{11}$ is independently an optionally substituted saturated hydrocarbon group having a carbon number of 1 to 6, an optionally substituted aryl group having a carbon number of 6 to 12, or a halogen atom, and each $R^{12}$ is independently a hydrogen atom, an optionally substituted hydrocarbon group having a carbon number of 1 to 6, an optionally substituted aryl group having a carbon number of 6 to 12, or a halogen atom):

[Chem. 2]

Formula (2)

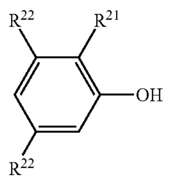

(in the formula (2), each $R^{22}$ is independently a hydrogen atom, an optionally substituted saturated or unsaturated hydrocarbon group having a carbon number of 1 to 20, an optionally substituted aryl group having a carbon number of 6 to 12, or a halogen atom, two $R^{22}$ cannot be both hydrogen atoms, and $R^{21}$ is a partial structure represented by the following formula (4):

[Chem. 3]

Formula (3)

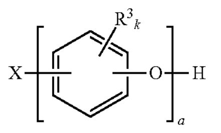

(in the formula (3), X is any a-valent linking group, a is an integer from 2 to 6, $R^3$ is one of a linear alkyl group having a carbon number of 1 to 8 and a partial structure represented by the following formula (4), and is bonded to the carbon atom of at least one of Position 2 or Position 6 when the position of the carbon atom of the benzene ring to which —O— is bonded is designated as Position 1, and k is each independently an integer from 1 to 4):

[Chem. 4]

Formula (4)

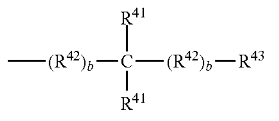

(in the formula (4), $R^{41}$ is each independently an optionally substituted linear alkyl group having a carbon number of 1 to 8, or is a cyclic alkyl structure having a carbon number of 1 to 8 to which two $R^{41}$ are bonded, each $R^{42}$ is independently an optionally substituted alkylene group having a carbon number of 1 to 8, b is each independently 0 or 1, $R^{43}$ is one of a hydrogen atom, an optionally substituted alkyl group having a carbon number of 1 to 8, or an optionally substituted phenyl group), and the partial structure represented by the formula (4), which is $R^{21}$ in the formula (2), and the partial structure represented by the formula (4) in $R^3$ in the formula (3) may be the same or different.

[2]

The polyphenylene ether according to [1], wherein $R^{21}$ is a t-butyl group in at least one repeating unit derived from the phenol of the formula (2).

[3]

The polyphenylene ether according to [1] or [2], wherein at least one $R^3$ in the formula (3) is a t-butyl group.

[4]

The polyphenylene ether according to any one of [1] to [3], wherein the polyphenylene ether has at least one partial structure selected from the group consisting of the following formula (5), formula (6), formula (7), and formula (8):

[Chem. 5]

Formula (5)

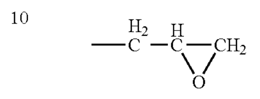

[Chem. 6]

Formula (6)

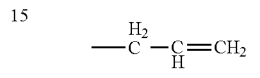

[Chem. 7]

Formula (7)

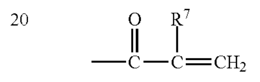

(in the formula (7), $R^7$ is a hydrogen atom or a saturated or unsaturated hydrocarbon group having a carbon number of 1 to 10, the saturated or unsaturated hydrocarbon may have a substituent to the extent that the condition of the carbon number being 1 to 10 is satisfied):

[Chem. 8]

Formula (8)

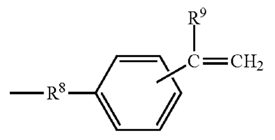

(in the formula (8), $R^8$ is a saturated or unsaturated divalent hydrocarbon group having a carbon number of 1 to 10, the saturated or unsaturated divalent hydrocarbon may have a substituent to the extent that the condition of the carbon number being 1 to 10 is satisfied, $R^9$ is a hydrogen atom or a saturated or unsaturated hydrocarbon group having a carbon number of 1 to 10, and the saturated or unsaturated hydrocarbon may have a substituent to the extent that the condition of the carbon number being 1 to 10 is satisfied).

[5]

The polyphenylene ether according to any one of [1] to [4], wherein a number average molecular weight in terms of polystyrene is from 500 to 15,000.

[6]

A production method of the polyphenylene ether according to any one of [1] to [5], comprising the step of performing oxidative polymerization of the phenol of the formula (1), the phenol of the formula (2), and the phenol of the formula (3).

[7]

A thermosetting composition comprising the polyphenylene ether according to any one of [1] to [6].

[8]

A prepreg, the prepreg being a composite comprising a base material and a thermosetting composition according to [7].

[9]

The prepreg according to [8], wherein the base material is glass cloth.

[10]

A laminate comprising a cured product of the prepreg according to [8] or [9] and a metal foil.

Advantageous Effect

According to the present disclosure, a polyphenylene ether with excellent solubility in general-purpose ketone-based solvents and a production method of the same can be provided. In addition, a thermosetting composition, a prepreg, and a laminate using the polyphenylene ether can also be provided.

DETAILED DESCRIPTION

The following provides details of an embodiment of the present disclosure (hereinafter referred to as "present embodiment"). The present embodiment described below is provided as an illustrative example to facilitate explanation of the present disclosure. However, the present disclosure is not limited to the present embodiment and can be implemented with appropriate alterations within the essential scope thereof.

In the present embodiment, a polyphenylene ether in which some or all of the hydroxyl groups included in the polyphenylene ether are modified is sometimes simply referred to as "polyphenylene ether". Thus, when the term "polyphenylene ether" is used, it includes both an unmodified polyphenylene ether and a modified polyphenylene ether, unless any contradiction arises.

Note that, in the present specification, the expression "A (value) to B (value)" means A or more and B or less. In addition, in this specification, the term "substituent" refers to, for example, saturated or unsaturated hydrocarbon groups having a carbon number of 1 to 10, aryl groups having a carbon number of 6 to 10, halogen atoms, and the like.

<Polyphenylene Ether>

A polyphenylene ether of the present embodiment is a polyphenylene ether including a repeating unit derived from a phenol of the following formula (1), a repeating unit derived from a phenol of the following formula (2), and a structural unit derived from a phenol of the following formula (3), and the polyphenylene ether may consist only of a repeating unit derived from a phenol of the following formula (1), a repeating unit derived from a phenol of the following formula (2), and a structural unit derived from a phenol of the following formula (3):

[Chem. 9]

Formula (1)

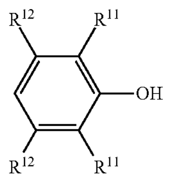

(in the formula (1), each $R^{11}$ is independently an optionally substituted saturated hydrocarbon group having a carbon number of 1 to 6, an optionally substituted aryl group having a carbon number of 6 to 12, or a halogen atom, and each $R^{12}$ is independently a hydrogen atom, an optionally substituted hydrocarbon group having a carbon number of 1 to 6, an optionally substituted aryl group having a carbon number of 6 to 12, or a halogen atom):

[Chem. 10]

Formula (2)

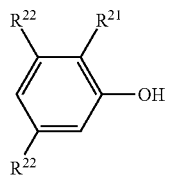

(in the formula (2), each $R^{22}$ is independently a hydrogen atom, an optionally substituted saturated or unsaturated hydrocarbon group having a carbon number of 1 to 20, an optionally substituted aryl group having a carbon number of 6 to 12, or a halogen atom, two $R^{22}$ cannot be both hydrogen atoms, and $R^{21}$ is a partial structure represented by the following formula (4):

[Chem. 11]

Formula (3)

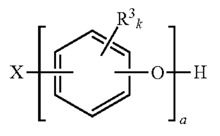

(in the formula (3), X is any a-valent linking group, a is an integer from 2 to 6, $R^3$ is one of a linear alkyl group having a carbon number of 1 to 8 and a partial structure represented by the following formula (4), and is bonded to the carbon atom of at least one of Position 2 or Position 6 when the position of the carbon atom of the benzene ring to which —O— is bonded is designated as Position 1, and k is each independently an integer from 1 to 4):

[Chem. 12]

Formula (4)

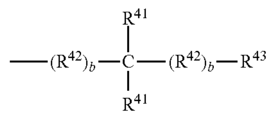

(in the formula (4), $R^{41}$ is each independently an optionally substituted linear alkyl group having a carbon number of 1 to 8, or is a cyclic alkyl structure having a carbon number of 1 to 8 to which two $R^{41}$ are bonded, each $R^{42}$ is independently an optionally substituted alkylene group having a carbon number of 1 to 8, b is each independently 0 or 1, $R^{43}$ is one of a hydrogen atom, an optionally substituted alkyl group having a carbon number of 1 to 8, or an optionally substituted phenyl group).

In the above formula (1), each $R^{11}$ is independently preferably a saturated hydrocarbon group having a carbon number of 1 to 6 or an aryl group having a carbon number of 6 to 12, more preferably a methyl group or a phenyl group, even more preferably a methyl group. In the formula (1), both of the two $R^{11}$ preferably have the same structure.

Examples of substituents in the saturated hydrocarbon group having a carbon number of 1 to 6 and the aryl group having a carbon number of 6 to 12 in $R^{11}$ above include saturated or unsaturated hydrocarbon groups having a carbon number of 1 to 10, aryl groups having a carbon number of 6 to 10, and halogen atoms.

In the above formula (1), each $R^{12}$ is independently preferably a hydrogen atom or a hydrocarbon group having a carbon number of 1 to 6, more preferably a hydrogen atom or a methyl group. In the formula (1), it is preferred that the two $R^{12}$ are different, and it is more preferred that one is a hydrogen atom and the other is a hydrocarbon group having a carbon number of 1 to 6 (preferably a methyl group).

Examples of substituents in the hydrocarbon group having a carbon number of 1 to 6 and the aryl group having a carbon number of 6 to 12 in $R^{12}$ above include saturated or unsaturated hydrocarbon groups having a carbon number of 1 to 10, aryl groups having a carbon number of 6 to 10, and halogen atoms.

In the above formula (2), each $R^{22}$ is independently preferably a hydrogen atom, a saturated or unsaturated hydrocarbon group having a carbon number of 1 to 15, or an aryl group having a carbon number of 6 to 12 which is optionally substituted with an alkyl group having a carbon number of 1 to 6, more preferably a hydrogen atom, a hydrocarbon group having a carbon number of 1 to 6, or an aryl group having a carbon number of 6 to 10 which is optionally substituted with an alkyl group having a carbon number of 1 to 6, and even more preferably a hydrogen atom or a methyl group. In the formula (2), it is preferred that the two $R^{22}$ are different, and it is more preferred that one is a hydrogen atom and the other is a hydrocarbon group having a carbon number of 1 to 6 (preferably a methyl group).

Examples of substituents in the saturated or unsaturated hydrocarbon group having a carbon number of 1 to 20 and the aryl group having a carbon number of 6 to 12 in $R^{22}$ above include saturated or unsaturated hydrocarbon groups having a carbon number of 1 to 10, aryl groups having a carbon number of 6 to 10, and halogen atoms.

In the above formula (3), each $R^3$ is independently a linear alkyl group having a carbon number of 1 to 8, such as methyl group, ethyl group, and n-propyl group, and one of partial structures represented by the above formula (4), and is preferably a methyl group or a structure of the above formula (4). Each of the a partial structures may be the same or different. In particular, it is preferred that each of the a partial structures has the same structure from the viewpoint of obtaining a polyphenylene ether with even better solvent solubility and a higher glass transition temperature after curing.

In the above formula (3), k is each independently an integer from 1 to 4, preferably from 2 to 4.

$R^3$ is bonded to the carbon atom of at least one of Position 2 or Position 6, when the position of the carbon atom of the benzene ring to which —O— is bonded is designated as Position 1, and when $R^3$ bonded to Position 2 and/or Position 6 is a linear alkyl group having a carbon number of 1 to 8, it is preferred that it is bonded to both Position 2 and Position 6. When $R^3$ bonded to Position 2 and/or Position 6 is a partial structure represented by the formula (4), it is preferred that it is bonded to either Position 2 or Position 6 only.

When $R^{21}$ in the above formula (2) and $R^3$ in the above formula (3) are both partial structures (functional groups) represented by the formula (4) (when both the phenolic compound represented by the above formula (2) and the phenolic compound represented by the above formula (3) are substituted with partial structures (functional groups) represented by the above formula (4)), the structure of each partial structure (functional group) represented by the formula (4) (functional group) may be the same or different.

In the above formula (3), X is any a-valent linking group, and examples thereof include, but are not particularly limited to, a hydrocarbon group such as a chain hydrocarbon and a cyclic hydrocarbon; a hydrocarbon group containing one or more atoms selected from nitrogen, phosphorus, silicon, and oxygen; an atom such as nitrogen, phosphorus, and silicon; and a combination of these, for example. X may be a linking group excluding a single bond. X may be a linking group connecting the a partial structures to each other.

Examples of the above X include an a-valent alkyl skeleton bonded to the benzene ring to which $R^3$ is bonded, via a single bond, an ester bond, or the like, an a-valent aryl skeleton bonded to the benzene ring to which $R^3$ is bonded, via a single bond, an ester bond, or the like, and an a-valent heterocyclic skeleton bonded to the benzene ring to which $R^3$ is bonded, via a single bond, an ester bond, or the like.

Here, examples of the alkyl skeleton include, but are not particularly limited to, a skeleton in which branched terminals of a chain hydrocarbon (e.g., a chain saturated hydrocarbon) branched into at least a branches having a carbon number of 2 to 6 are directly bonded to the benzene ring of the partial structure (it is suffice that the benzene ring is bonded to the a branched terminals, and there may be a branched terminal not bonded to the benzene ring), for example. Examples of the aryl skeleton include, but are not particularly limited to, a skeleton in which a benzene ring, a mesitylene group, or a 2-hydroxy-5-methyl-1,3-phenylene group is bonded to the benzene ring to which $R^3$ is bonded, via a single bond or an alkyl chain, for example. Examples of the heterocyclic skeleton include, but are not particularly limited to, a skeleton in which a triazine ring is bonded to the benzene ring to which $R^3$ is bonded, via a single bond or an alkyl chain, for example.

In the above formula (3), a is an integer from 2 to 6, preferably an integer from 2 to 4.

The partial structure represented by the above formula (4) is preferably a group containing secondary and/or tertiary carbon exemplified by an isopropyl group, an isobutyl group, a sec-butyl group, a tert-butyl group, a tert-amyl group, a 2,2-dimethylpropyl group, a cyclohexyl group, and a structure with a phenyl group at a terminal of any of these, more preferably a tert-butyl group and a cyclohexyl group, and even more preferably a tert-butyl group.

Examples of the substituent in the linear alkyl group having a carbon number of 1 to 8 in $R^{41}$ above, the substituent in the alkylene group having a carbon number of 1 to 8 in $R^{42}$ above, and the substituent in the alkyl and phenyl groups having a carbon number of 1 to 8 in $R^{43}$ above include saturated or unsaturated hydrocarbon groups having a carbon number of 1 to 10, aryl groups having a carbon number of 6 to 10, and halogen atoms.

As mentioned above, where $R^{21}$ in the above formula (2) is a partial structure represented by the formula (4) and $R^3$ in the formula (3) may be a partial structure represented by the formula (4), these partial structures represented by the formula (4) may be the same or different.

In the present embodiment, the structure of the polyphenylene ether can be identified by analyzing with NMR, mass spectrometry, and other techniques. As a specific method to identify the structure of the polyphenylene ether, field desorption mass spectrometry (FD-MS), which is known to be less prone to fragmentation, can be performed, and the repeating units can be estimated by the intervals of ions detected. Furthermore, the structure of the polyphenylene ether can be estimated by analyses of peaks of fragment ions with electron ionization (EI) in combination with structural analyses by NMR.

From the viewpoint of obtaining a polyphenylene ether of the present embodiment with excellent solvent solubility and low dielectric dissipation factor, it is preferable that the repeating unit derived from a phenol of the formula (2) is preferably 10 mol % or more, more preferably 15 mol % or more, and even more preferably 20 mol % or more, when the sum of the repeating unit derived from a phenol of the formula (1) and the repeating unit derived from a phenol of the formula (2) is taken as 100 mol % or more. In addition, the repeating unit derived from a phenol of the formula (2) is preferably 95 mol % or less, more preferably 90 mol % or less, and even more preferably 85 mol % or less. From the same viewpoint, the repeating unit derived from a phenol of the formula (1) is preferably 90 mol % or less, more preferably 85 mol % or less, and even more preferably 80 mol % or less. In addition, the repeating unit derived from a phenol of the formula (1) is preferably 5 mol % or more, more preferably 10 mol % or more, and even more preferably 15 mol % or more.

The total molar ratio of the repeating unit derived from a phenol of the formula (1) and the repeating unit derived from a phenol of the formula (2) with respect to 100 mol % of the monomer units contained in the polyphenylene ether of the present embodiment (for example, all monomer units derived from phenols in the polyphenylene ether) is preferably 70 mol % or more, more preferably 80 mol % or more, and even more preferably 85 mol % or more. The above total molar ratio is preferably 99.9 mol % or less, more preferably 99 mol % or less, and even more preferably 98 mol % or less.

The molar ratio of the structural unit derived from a phenol of the formula (3) with respect to 100 mol % of monomer units (e.g., all monomer units derived from phenols in the polyphenylene ether) included in the polyphenylene ether of the present embodiment is 0.1 mol % or more, more preferably 1 mol % or more, more preferably 2 mol % or more, and from the viewpoint of monomer reactivity, it is preferably 30 mol % or less, more preferably 20 mol % or less, more preferably 15 mol % or less.

The molar ratio of the sum of the repeating unit derived from a phenol of the formula (1) and the repeating unit derived from a phenol of the formula (2) to the structural unit derived from a phenol of the formula (3) (the sum of the repeating unit derived from a phenol of the formula (1) and the repeating unit derived from a phenol of the formula (2): the structural unit derived from a phenol of the formula (3)) is preferably 99.5:0.5 to 70:30, more preferably 99:1 to 80:20, even more preferably 98.5:1.5 to 85:15, and particularly preferably 98:2 to 92:8.

The repeating unit derived from a phenol of the formula (1) included in the polyphenylene ether of the present embodiment may be of one type or two or more types. In addition, the repeating unit derived from a phenol of the formula (2) included in the polyphenylene ether of the present embodiment may be of one type or two or more types. In addition, the repeating unit derived from a phenol of the formula (3) in the polyphenylene ether of the present embodiment may be of one type or two or more types.

The respective ratios of the repeating unit derived from a phenol of the formula (1), the repeating unit derived from a phenol of the formula (2), and the structural unit derived from a phenol of the formula (3) can be determined by analytical methods such as $^{1}H$ NMR and $^{13}C$ NMR, for example, and more specifically by the methods described in the EXAMPLES section described below.

Because the phenol of the formula (1) does not have an unsubstituted ortho position (i.e., no hydrogen atom is bonded to the two ortho carbon atoms to which the hydroxyl group is bonded), it can react with another phenolic monomer at only the carbon atom in the para position relative to the phenolic hydroxyl group. Thus, the repeating unit derived from the formula (1) includes a repeating unit having a structure of the following formula (9):

[Chem. 13]

Formula (9)

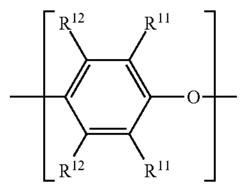

(In the formula (9), $R^{11}$ and $R^{12}$ are the same as those in the formula (1)).

The phenol of the formula (2) is capable of reacting with another phenolic monomer at either the ortho or para position of the phenol in addition to the phenolic hydroxyl group. Thus, the repeating unit derived from a phenol of the formula (2) has a structure of the following formula (10), a structure of the following formula (11), or a combination thereof:

[Chem. 14]

Formula (10)

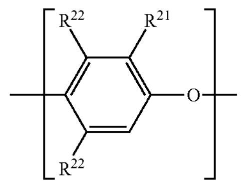

[Chem. 15]

Formula (11)

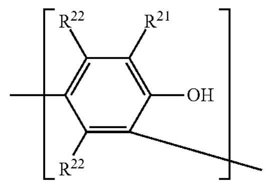

($R^3$ in the formulae (10) and (11) are the same as those in the formula (2)).

If the phenol of the formula (3) has no unsubstituted ortho position, the structural unit derived from the phenol of the formula (3) has the structure of the following formula (12); or if the phenol of the formula (3) has an unsubstituted ortho position, the structure derived from the phenol of the formula (3) has a structure of the following formula (12), a structure of the following formula (13) or a combination of these:

[Chem. 16]

Formula (12)

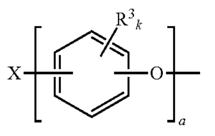

[Chem. 17]

Formula (13)

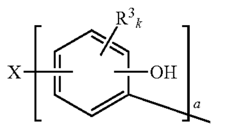

($R^3$ in the formula (12) and the formula (13) are the same as those in the formula (3)).

The polyphenylene ether in the present embodiment may be a modified polyphenylene ether in which hydroxyl groups in the polyphenylene ether is modified with a functional group (e.g., a functional group containing an unsaturated carbon bond).

The polyphenylene ether in the present embodiment may have at least one partial structure selected from the group consisting of the following formula (5), formula (6), formula (7), and formula (8):

[Chem. 18]

Formula (5)

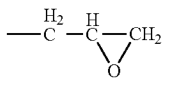

[Chem. 19]

Formula (6)

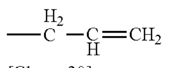

[Chem. 20]

Formula (7)

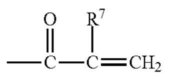

(in the formula (7), $R^7$ is a hydrogen atom or a saturated or unsaturated hydrocarbon group having a carbon number of 1 to 10, and the saturated or unsaturated hydrocarbon may have a substituent to the extent that the total carbon number of $R^7$ is 1 to 10):

[Chem. 21]

Formula (8)

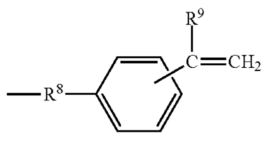

(in the formula (8), $R^8$ is a saturated or unsaturated divalent hydrocarbon group having a carbon number of 1 to 10, the above saturated or unsaturated divalent hydrocarbon may have a substituent to the extent that the total carbon number of $R^8$ is 1 to 10, $R^9$ is a hydrogen atom or a saturated or unsaturated hydrocarbon group having a carbon number of 1 to 10, and the saturated or unsaturated hydrocarbon may have substituents to the extent that the total carbon number of $R^9$ is 1 to 10).

Note that the partial structure represented by at least one of the group consisting of the above formula (5), formula (6), formula (7), and formula (8) above may be directly bonded to the oxygen of the hydroxyl group in the polyphenylene ether.

The respective ratios of the repeating unit derived from the phenol of the formula (1) and the repeating unit derived from the phenol of the formula (2) in the modified polyphenylene ether in which the partial structure represented by at least one of the group consisting of the above the above formula (5), formula (6), formula (7), and formula (8) is introduced can be determined using analytical methods such as $^1H$ NMR, $^{13}C$ NMR, for example. More specifically, they can be measured by the method described in the Examples below.

The polyphenylene ether of the present embodiment preferably has a number average molecular weight in terms of polystyrene from 500 to 15,000, more preferably from 1,000 to 14,000, and even more preferably from 1,500 to 13,000, from the viewpoint of both heat resistance and ensuring solution viscosity for easy handling.

Note that the number average molecular weight can be determined by using the method described in the Examples section below.

<Production Method of Polyphenylene Ether>

The polyphenylene ether of the present embodiment is obtained, for example, by a method that includes at least the step of performing oxidative polymerization of monovalent phenolic compounds represented by the above formula (1) and formula (2) and a polyvalent phenolic compound represented by the above formula (3). The above step of performing oxidative polymerization is preferably performed by oxidative polymerization of a raw material containing at least a phenol of the formula (1), a phenol of the formula (2), and a phenol of the above formula (3).

Examples of monovalent phenolic compounds represented by the above formula (1) include, for example, 2,6-dimethylphenol, 2-methyl-6-ethylphenol, 2,6-diethylphenol, 2-ethyl-6-n-propylphenol, 2-methyl-6-chlorophenol, 2-methyl-6-bromophenol, 2-methyl-6-n-propylphenol, 2-ethyl-6-bromophenol, 2-methyl-6-n-butylphenol, 2,6-di-n-propylphenol, 2-ethyl-6-chlorophenol, 2-methyl-6-phenylphenol, 2,6-diphenylphenol, 2-methyl-6-tolylphenol, 2,6-ditolylphenol, 2,3,6-trimethylphenol, 2,3-diethyl-6-n-propylphenol, 2,3,6-tributylphenol, 2,6-di-n-butyl-3-methylphenol, 2,6-dimethyl-3-n-butylphenol, and 2,6-dimethyl-3-t-butylphenol. Of these, 2,6-dimethylphenol, 2,3,6-trimethylphenol, and 2,6-diphenylphenol are particularly preferred because they are inexpensive and readily available.

One monovalent phenolic compound represented by the above formula (1) may be used alone, or two or more of these may be used in combination.

Examples of monovalent phenolic compounds represented by the above formula (2) include, for example, 2-isopropyl-5-methylphenol, 2-cyclohexyl-5-methylphenol, 2-tert-butyl-5-methylphenol, and 2-isobutyl-5-methylphenol. From the viewpoint of suppressing hyperbranching and gelation, 2-t-butyl-5-methylphenol and 2-cyclohexyl-5-methylphenoll, which are bulky substituents, are more preferred.

One monovalent phenolic compound represented by the above formula (2) may be used alone, or two or more of these may be used in combination.

Among the polyvalent phenolic compounds represented by the above formula (3), examples of phenolic compounds having two phenolic units in the molecule include, for example, 2,2-bis(3,5-dimethyl-4-hydroxyphenyl)propane,
2,2-bis(4-hydroxy-3-methylphenyl)propane,
4,4'-methylenebis(2,6-dimethylphenol),
bis(4-hydroxy-3-methylphenyl)sulfide,
bis(4-hydroxy-3,5-dimethylphenyl)sulfone,
α,α-bis(4-hydroxy-3,5-dimethylphenyl)-1,4-diisopropylbenzene,
9,9-bis(4-hydroxy-3-methylphenyl)fluorene,
1,1-bis(4-hydroxy-3-methylphenyl)cyclohexane, and
1,1-bis(2-methyl-4-hydroxy-5-t-butylphenyl)butane.

Among these,
2,2-bis(3,5-dimethyl-4-hydroxyphenyl)propane and
1,1-bis(2-methyl-4-hydroxy-5-t-butylphenyl)butane are particularly preferred because they are inexpensive and easily available.

Further, among the polyvalent phenolic compounds represented by the above formula (3), examples of phenolic compounds having three phenolic units in the molecule include, for example, 4,4'-[(3-hydroxyphenyl)methylene]bis(2,6-dimethylphenol),
4,4'-[(3-hydroxyphenyl)methylene]bis(2,3,6-trimethylphenol),
4,4'-[(4-hydroxyphenyl)methylene]bis(2,6-dimethylphenol),
4,4'-[(4-hydroxyphenyl)methylene]bis(2,3,6-trimethylphenol),
4,4'-[(2-hydroxy-3-methoxyphenyl)methylene]bis(2,6-dimethylphenol),
4,4'-[(4-hydroxy-3-ethoxyphenyl)methylene]bis(2,3,6-trimethylethylphenol),
4,4'-[(3,4-dihydroxyphenyl)methylene]bis(2,6-dimethylphenol),
4,4'-[(3,4-dihydroxyphenyl)methylene]bis(2,3,6-trimethylphenol),
2,2'-[(4-hydroxyphenyl)methylene]bis(3,5,6-trimethylphenol),
4,4'-[4-(4-hydroxyphenyl)cyclohexylidene]bis(2,6-dimethylphenol),
4,4'-[(2-hydroxyphenyl)methylene]-bis(2,3,6-trimethylphenol),
4,4'-[1-[4-[1-(4-hydroxy-3,5-dimethylphenyl)-1-methylethyl]phenyl]ethylene]bis(2,6-dimethylphenol),
4,4'-[1-[4-[1-(4-hydroxy-3-fluorophenyl)-1-methylethyl]phenyl]ethylene]bis(2,6-dimethylphenol),
2,6-bis[(4-hydroxy-3,5-dimethylphenyl)ethyl]-4-methylphenol,
2,6-bis[(4-hydroxy-2,3,6-trimethylphenyl)methyl]-4-methylphenol,
2,6-bis[(4-hydroxy-3,5,6-trimethylphenyl)methyl]-4-ethylphenol,
2,4-bis[(4-hydroxy-3-methylphenyl)methyl]-6-methylphenol,
2,6-bis[(4-hydroxy-3-methylphenyl)methyl]-4-methylphenol,
2,4-bis[(4-hydroxy-3-cyclohexylphenyl)methyl]-6-methylphenol,
2,4-bis[(4-hydroxy-3-methylphenyl)methyl]-6-cyclohexylphenol,
2,4-bis[(2-hydroxy-5-methylphenyl)methyl]-6-cyclohexylphenol,
2,4-bis[(4-hydroxy-2,3,6-trimethylphenyl)methyl]-6-cyclohexylphenol,
3,6-bis[(4-hydroxy-3,5-dimethylphenyl)methyl]-1,2-benzenediol,
4,6-bis[(4-hydroxy-3,5-dimethylphenyl)methyl]-1,3-benzenediol,
2,4,6-tris[(4-hydroxy-3,5-dimethylphenyl)methyl]-1,3-benzenediol,
2,4,6-tris[(2-hydroxy-3,5-dimethylphenyl)methyl]-1,3-benzenediol,
2,2'-methylenebis[6-[(4/2-hydroxy-2,5/3,6-dimethylphenyl)methyl]-4-methyl phenol],
2,2'-methylenebis[6-[(4-hydroxy-3,5-dimethylphenyl)methyl]-4-methylphenol],
2,2'-methylenebis[6-[4(4/2-hydroxy-2,3,5/3,4,6-trimethylphenyl)methyl]-4-methylphenol],
2,2'-methylenebis[6-[(4-hydroxy-2,3,5-trimethylphenyl)methyl]-4-methylphenol], 4,4'-methylenebis[2-[(2,4-dihydroxyphenyl)methyl]-6-methylphenol],
4,4'-methylenebis[2-[(2,4-dihydroxyphenyl)methyl]-3,6-dimethylphenol],
4,4'-methylenebis[2-[(2,4-dihydroxy-3-methylphenyl)methyl]-3,6-dimethylphenol],
4,4'-methylenebis[2-[(2,3,4-trihydroxyphenyl)methyl]-3,6-dimethylphenol],
6,6'-methylenebis[4-[(4-hydroxy-3,5-dimethylphenyl)methyl]-1,2,3-benzenetriol],
4,4'-cyclohexylidenebis[2-cyclohexyl-6-[(2-hydroxy-5-methylphenyl)methyl]phenol],
4,4'-cyclohexylidenebis[2-cyclohexyl-6-[(4-hydroxy-3,5-dimethylphenyl)methyl]phenol],
4,4'-cyclohexylidenebis[2-cyclohexyl-6-[(4-hydroxy-2-methyl-5-cyclohexylphenyl)methyl]phenol],
4,4'-cyclohexylidenebis[2-cyclohexyl-6-[(2,3,4-trihydroxyphenyl)methyl]phenol], 4,4',4",4'"-(1,2-ethanediyl)tetrakis(2,6-dimethylphenol),
4,4',4",4'"-(1,4-phenylenedimethylidene)tetrakis(2,6-dimethylphenol), and
1,1,3-tris(2-methyl-4-hydroxy-5-t-butylphenyl)butane. Of these,
1,1,3-tris(2-methyl-4-hydroxy-5-t-butylphenyl)butane is preferred because they are inexpensive and readily available.

One of the multivalent phenolic compounds represented by the above formula (3) may be used alone, or two or more of these may be used in combination.

There is no restriction on the number of phenolic hydroxyl groups in the polyvalent phenolic compound represented by the above formula (3), as long as the number is 2 to 6. From the viewpoint of easier control of heat curing speed, the number is preferably 2 to 4.

Usually, an ether bond can be formed at the ortho position in oxidative polymerization of a phenol having a hydrogen atom at the ortho position (e.g., 2-methylphenol, 2,5-dimethylphenol, or 2-phenylphenol). Therefore, it is difficult to control the bonding position of the phenolic compound during oxidative polymerization, resulting in a high molecular weight polymer that is polymerized in a branched shape and ultimately generation of gel components that are insoluble in solvents.

On the other hand, when a phenol having a bulky substituent at one ortho position represented by the above formula (2) is used, it is possible to control the bonding position of the phenolic compound during oxidative polymerization despite a hydrogen atom is present at the opposite ortho position, which suppresses gelation and provides a polyphenylene ether that is soluble in solvents.

(Oxidative Polymerization Step)

Here, in the production method of the polyphenylene ether, an aromatic solvent, which is a good solvent for the polyphenylene ether, can be used as a polymerization solvent in the oxidative polymerization step.

Here, a good solvent of the polyphenylene ether refers to a solvent capable of dissolving the polyphenylene ether, and examples of such a solvent include aromatic hydrocarbons such as benzene, toluene, xylene (including o-, m-, and p-isomers), and ethylbenzene; halogenated hydrocarbons such as chlorobenzene and dichlorobenzene; and nitro compounds such as nitrobenzene, for example.

As the polymerization catalyst used in the present embodiment, well-known catalyst systems which can be generally used for production of polyphenylene ethers can be used. Catalyst systems composed of a transition metal ion having oxidation-reduction capability and an amine compound capable of forming a complex with the transition metal ion are well known, and examples thereof include a catalyst system composed of a copper compound and an amine compound, a catalyst system composed of a manganese compound and an amine compound, and a catalyst system composed of a cobalt compound and an amine compound, for example. Because the polymerization reaction proceeds efficiently under a slight alkaline condition, a small amount of an alkaline or an additional amine compound may be added in the system.

The polymerization catalyst used in the present embodiment is preferably a catalyst composed of a copper compound, a halogen compound, and an amine compound as the components of the catalyst, and more preferably a catalyst containing a diamine compound represented by the following formula (14) as the amine compound.

[Chem. 22]

Formula (14)

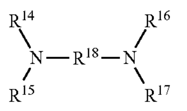

In the formula (14), $R^{14}$, $R^{15}$, $R^{16}$, and $R^{17}$ are each independently a hydrogen atom or a linear or branched alkyl group having a carbon number of 1 to 6. However, $R^{14}$, $R^{15}$, $R^{16}$, and $R^{17}$ cannot be all hydrogen atoms. $R^{18}$ is an alkylene group having a carbon number of 2 to 5 which is linear or has a methyl branch.

Examples of the copper compound as the component of the catalyst described herein are listed. The preferred copper compound that can be used may be a cuprous compound, a cupric compound or a mixture thereof. Examples of the cupric compound include cupric chloride, cupric bromide, cupric sulfate, and cupric nitrate. Examples of the cuprous compound include cuprous chloride, cuprous bromide, cuprous sulfate, and cuprous nitrate. Among these metal compounds, cuprous chloride, cupric chloride, cuprous bromide, and cupric bromide are particularly preferable. Copper salts of these may be synthesized from an oxide (for example, cuprous oxide), carbonate, hydroxide, or the like and a corresponding halogen or acid at the time of use. A frequently used method includes preparing a mixture of a cuprous oxide and a hydrogen halide (or a solution of the hydrogen halide) as exemplified above in advance.

Examples of the halogen compound include hydrogen chloride, hydrogen bromide, hydrogen iodide, sodium chloride, sodium bromide, sodium iodide, potassium chloride, potassium bromide, potassium iodide, tetramethylammonium chloride, tetramethylammonium bromide, tetramethylammonium iodide, tetraethylammonium chloride, tetraethylammonium bromide, and tetraethylammonium iodide, for example. These may be used in the form of an aqueous solution or a solution with an appropriate solvent. These halogen compounds may be used alone, or two or more of these may be used in combination as the component. A preferred halogen compound is an aqueous solution of hydrogen chloride or an aqueous solution of hydrogen bromide.

The amount of these compounds to be used is not particularly limited, but the amount of halogen atoms is preferably 2 times or more and 20 times or less of the molar amount of copper atoms, and the amount of the copper atoms to be used is preferably in the range of 0.02 mol to 0.6 mol with respect to 100 mol of the phenolic compound to be added in the polymerization reaction.

Next, examples of the diamine compound as the component of the catalyst are listed. Examples include N,N,N',N'-tetramethylethylenediamine, N,N,N'-trimethylethylenediamine, N,N-dimethylethylenediamine, N,N,N',N'-tetraethylethylenediamine, N,N'-diethylethylenediamine, N-ethylethylenediamine, N,N'-dimethylethylenediamine, N-methylethylenediamine, N,N,N'-triethylethylenediamine, N,N-diethylethylenediamine, N,N-dimethyl-N'-ethylethylenediamine, N,N'-dimethyl-N-ethylethylenediamine, N-n-propylethylenediamine, N,N'-n-propylethylenediamine, N-i-propylethylenediamine, N,N'-i-propylethylenediamine, N-n-butylethylenediamine, N,N'-n-butylethylenediamine, N-i-butylethylenediamine, N,N'-i-butylethylenediamine, N-t-butylethylenediamine, N,N'-t-butylethylenediamine, N,N,N',N'-tetramethyl-1,3-diaminopropane, N,N,N'-trimethyl-1,3-diaminopropane, N,N'-dimethyl-1,3-diaminopropane, N-methyl-1,3-diaminopropane, N,N,N',N'-tetramethyl-1,3-diamino-1-methylpropane, N,N,N',N'-tetramethyl-1,3-diamino-2-methylpropane, N,N,N',N'-tetramethyl-1,4-diaminobutane, and N,N,N',N'-tetramethyl-1,5-diaminopentane, for example. Preferred diamine compounds for the present embodiment are those in which the alkylene group connecting two nitrogen atoms has a carbon number of 2 or 3. Although the amount of such a diamine compound that is used is not specifically limited, the amount is preferably in a range of 0.01 mol to 10 mol with respect to 100 mol of the phenolic compound to be added in the polymerization reaction.

In the present embodiment, a primary amine and a secondary monoamine may be included as components of the polymerization catalyst. Examples of the secondary monoamine include, but are not limited to, dimethylamine, diethylamine, di-n-propylamine, di-i-propylamine, di-n-butylamine, di-i-butylamine, di-t-butylamine, dipentylamines, dihexylamines, dioctylamines, didecylamines, dibenzylamines, methylethylamine, methylpropylamine, methylbutylamine, cyclohexylamine, N-phenylmethanolamine, N-phenylethanolamine, N-phenylpropanolamine, N-(m-methylphenyl)ethanolamine, N-(p-methylphenyl)ethanolamine, N-(2',6'-dimethylphenyl)ethanolamine, N-(p-chlorophenyl)ethanolamine, N-ethylaniline, N-butylaniline, N-methyl-2-methylaniline, N-methyl-2,6-dimethylaniline, and diphenylamine, for example.

A tertiary monoamine compound may also be included as a component of the polymerization catalyst in the present embodiment. A tertiary monoamine compound refers to an aliphatic tertiary amine, inclusive of an alicyclic tertiary amine. Examples thereof include trimethylamine, triethylamine, tripropylamine, tributylamine, triisobutylamine, dimethylethylamine, dimethylpropylamine, allyldiethylamine, dimethyl-n-butylamine, diethylisopropylamine, and N-methylcyclohexylamine, for example. These tertiary monoamines may be used alone, or two or more of these may be used in combination. The amount thereof to be used is not particularly limited, but is preferably in a range of 15 mol or less with respect to 100 mol of the phenolic compound to be added to the polymerization reaction.

In the present embodiment, there is no limitation on addition of a surfactant which is conventionally known to have an effect of enhancing polymerization activity. The surfactant may, for example, be trioctylmethylammonium chloride known by the product names Aliquat 336 and CapRiquat. The amount thereof to be used is preferably within a range not exceeding 0.1 mass % with respect to 100 mass % of the total amount of the polymerization reaction mixture.

Examples of oxygen-containing gases for polymerization of the present embodiment include pure oxygen, a mixture of oxygen and an inert gas such as nitrogen in any ratio, air, and a mixture of air and an inert gas such as nitrogen in any ratio, for example. It is suffice that the internal pressure during the polymerization reaction is normal pressure, but a reduced pressure or an increased pressure may be used if necessary.

The temperature of the polymerization is not particularly limited, but is in the range of preferably 0 to 60° C., more preferably 10 to 40° C., because the reaction becomes difficult to proceed when the temperature it is too low, whereas the reaction selectivity may be reduced and gel may be generated when it is too high.

In the production method of the polyphenylene ether, polymerization can also be carried out in a poor solvent such as alcohols.

(Copper Extraction and By-Product Removal Step)

In the present embodiment, there is no particular limitation on the post-treatments after the polymerization reaction is completed. Typically, an acid such as hydrochloric acid or acetic acid, or ethylenediaminetetraacetic acid (EDTA) and a salt thereof, nitrilotriacetic acid and a salt thereof, or the like is added to the reaction solution for deactivating the catalyst. Further, by-produced dihydric phenol products generated by polymerization of polyphenylene ether can be removed using a conventional well-known method. In the case where metal ions serving as the catalyst have been substantially deactivated as described above, the mixture is decolorized only by heating. A method in which a required amount of a well-known reducing agent is added is also employed. Examples of the well-known reducing agent include hydroquinone and sodium dithionite, for example.

(Liquid-Liquid Separation Step)

In the production method of the polyphenylene ether, water may be added to extract the compound in which the copper catalyst has been deactivated, followed by liquid-liquid separation between the organic phase and the aqueous phase, and the aqueous phase is then separated from the organic phase to remove the copper catalyst. Examples of this liquid-liquid separation step include, but are not particularly limited to, settled separation and separation by a centrifuge. A well-known surfactant or the like may be employed for promoting the liquid-liquid separation described above.

(Concentration and Drying Step)

Subsequently, in the production method of the polyphenylene ether of the present embodiment, an organic phase containing the polyfunctional polyphenylene obtained after the liquid-liquid separation may be concentrated and dried by volatilizing the solvent.

Examples of the method of volatilizing the solvent contained in the organic phase include, but are not particularly limited to, a method in which the organic phase is transferred to a concentration tank set to a high temperature to distill off the solvent for concentration, and a method in which toluene is distilled off using an instrument such as a rotary evaporator for concentration.

The temperature of drying in the drying step is preferably at least 60° C. or higher, more preferably 80° C. or higher, even more preferably 120° C. or higher, and most preferably 140° C. or higher. Drying of the polyphenylene ether at a temperature of 60° C. or higher can efficiently reduce the content of high boiling point volatile components in the polyphenylene ether powder.

Methods effective for obtaining the polyphenylene ether at high efficiency include raising drying temperature, increasing the degree of vacuum in a drying atmosphere, performing stirring during drying, and the like; among these, particularly preferred from the viewpoint of production efficiency is raising drying temperature. The drying step is preferably carried out using a dryer equipped with a mixing function. Examples of a dryer equipped with a mixing function include a stirring-type dryer and a rolling-type dryer. This increases throughput and maintains high productivity.

The polyphenylene ether of the present embodiment can also be produced by a redistribution reaction in which a polyphenylene ether derived from a phenol of the above formula (1) is equilibrated with a phenolic compound of the formula (2) and a phenolic compound of the above formula (3) in the presence of an oxidizing agent. Redistribution reactions are well-known in the art, and are disclosed, for example, in U.S. Pat. No. 3,496,236 B to Cooper et al. and U.S. Pat. No. 5,880,221 B to Liska et al.

(Modification Reaction Step)

There is no limitation on the method of introducing a functional group into hydroxyl groups of an unmodified polyphenylene ether. For example, it can be achieved by the reaction to form an ester bond between a hydroxyl group of the unmodified polyphenylene ether and a carboxylic acid having a carbon-carbon double bond (hereinafter referred to as "carboxylic acid"). A wide variety of well-known methods can be utilized for forming the ester bond. Examples include methods by: a. reaction of the hydroxyl group at the terminal of the polymer with a carboxylic acid halide; b. formation of an ester bond by reaction with a carboxylic anhydride; c. direct reaction with a carboxylic acid; and d. method by transesterification, for example. Among these, a. reaction with a carboxylic acid halide is one of the most common methods. Chlorides and bromides are typically used as the carboxylic acid halide, but other halides may be utilized. The reaction may be either a direct reaction with the hydroxyl group or a reaction of an alkali metal salt of the hydroxyl group. Because an acid such as hydrogen halide is generated in a direct reaction of the hydroxyl group with a carboxylic acid halide, a weak base such as an amine may be added for the purpose of trapping the acid. In b. reaction with a carboxylic anhydride or c. direct reaction with a carboxylic acid, a compound such as carbodiimides and dimethylaminopyridine, for example, may be added for activating the reaction site to accelerate the reaction. In the case of d. transesterification reaction, it is desirable to remove produced alcohols if necessary. In addition, a well-known metal catalyst may be added for accelerating the reaction. After the reaction, washing with water or an acidic or alkaline aqueous solution may be carried out for removing by-products such as amine salts, or the polymer solution may be added dropwise into a poor solvent such as an alcohol to recover the target product by reprecipitation. In addition, after the polymer solution is washed, the solvent may be distilled off under a reduced pressure to recover the polymer.

The production method of the modified polyphenylene ether of the present embodiment is not limited to the production method of the modified polyphenylene ether of the present embodiment described above, and the order and the number of times of the oxidative polymerization step, the copper extraction and by-product removal step, the liquid-liquid separation step, and the concentration and drying step, and the like described above may be appropriately modified.

(Polyphenylene Ether Solution)

A polyphenylene ether solution of the present embodiment contains at least the polyphenylene ether of the present embodiment described above and a ketone-based solvent, and may also contain other components. As the solvent, a solvent other than the ketone-based solvent may also be contained.

Examples of the above ketone-based solvent include acetone, methyl ethyl ketone, methyl propyl ketone, methyl isobutyl ketone, diisobutyl ketone, and cyclohexanone.

The ratio of the total mass of the above polyphenylene ether and the above ketone-based solvent with respect to 100 mass % of the above polyphenylene ether solution is preferably 80 mass % or more, more preferably 90 mass % or more, even more preferably 95 mass % or more, and particularly preferably 100%.

The preferred mass ratio of the above polyphenylene ether with respect to 100 mass % of the above polyphenylene ether solution is 1 to 40 mass %. In addition, the mass ratio of the above ketone-based solvent with respect to 100 mass % of the above polyphenylene ether solution is preferably 60 to 99 mass %.

The above polyphenylene ether solution can be made, for example, by mixing the above polyphenylene ether, the above ketone-based solvent, and optional other components or other solvents.

<Thermosetting Composition>

The polyphenylene ether of the present embodiment can be used as a raw material for a thermosetting composition. The thermosetting composition is not limited as long as it contains the polyphenylene ether, but it preferably contains a crosslinking agent and an organic peroxide, and can further contain a thermoplastic resin, a flame retardant, other additives, a silica filler, a solvent, etc., if desired. The components of the thermosetting composition of the present embodiment will be described below.

(Polyphenylene Ether)

As mentioned above, the polyphenylene ether of the present embodiment may be used as a single resin in the thermosetting composition, or may be used in combination with a polyphenylene ether having a different structure or with various known additives.

When used in combination with other components, the content of the polyphenylene ether in the thermosetting composition is preferably 0.5 to 95 mass %, more preferably 20 to 93 mass %, and even more preferably 40 to 90 mass %.

(Crosslinking Agent)

In the thermosetting composition of the present embodiment, any crosslinking agent capable of causing or promoting a crosslinking reaction can be used.

The crosslinking agent preferably has a number average molecular weight of 4,000 or less. When the average molecular weight of the crosslinking agent is 4,000 or less, the increase in viscosity of the thermosetting composition can be suppressed and good resin flowability during heat molding can be obtained.

Note that the number average molecular weight can be a value measured by a generally-used molecular weight measurement method, and is specifically a value measured by GPC.

In view of crosslinking reactions, the crosslinking agent preferably has two or more carbon-carbon unsaturated double bonds in average per molecule. The cross-linking agent may be composed of one compound or may be composed of two or more compounds.

Note that the term "carbon-carbon unsaturated double bond" as used herein refers to a double bond located at the end of a branch from the main chain when the crosslinking agent is a polymer or an oligomer. Examples of the carbon-carbon unsaturated double bonds are, for example, 1,2-vinyl bonds in polybutadiene.

When the average molecular weight of the crosslinking agent is less than 600, the number (average value) of carbon-carbon unsaturated double bonds per molecule of the crosslinking agent is preferably from 2 to 4. When the number average molecular weight of the crosslinking agent is 600 or more and less than 1,500, the number (average value) of carbon-carbon unsaturated double bonds per molecule of the crosslinking agent is preferably from 4 to 26. When the number average molecular weight of the crosslinking agent is 1,500 or more and less than 4,000, the number (average value) of carbon-carbon unsaturated double bonds per molecule of the crosslinking agent is preferably from 26 to 60. When the number of carbon-carbon unsaturated double bonds is the above specified value or more in the case where the number average molecular weight of the crosslinking agent is within the above range, the reactivity of the crosslinking agent is further increased in the thermosetting composition of the present embodiment and the crosslinking density of a cured product of the thermosetting composition is further improved, resulting in further excellent heat resistance. On the other hand, when the number of carbon-carbon unsaturated double bonds is the above specified value or less in the case where the number average molecular weight of the crosslinking agent is within the above range, even better resin flowability during heat molding can be provided.

Examples of the cross-linking agent include, for example, trialkenyl isocyanurate compounds such as triaryl isocyanurate (TAIC), trialkenyl cyanurate compounds such as triaryl cyanurate (TAC), polyfunctional methacrylate compounds containing two or more methacrylate groups in the molecule, polyfunctional acrylate compounds containing two or more acrylate groups in the molecule, polyfunctional vinyl compounds containing two or more vinyl groups in the molecule such as polybutadiene, vinylbenzyl compounds containing a vinylbenzyl group in the molecule such as divinylbenzene, and polyfunctional maleimide compounds containing two or more maleimide groups in the molecule such as 4,4'-bis(maleimido)diphenylmethane. One of these cross-linking agents may be used individually, or two or more of these may be used in combination.

Among these, the crosslinking agent preferably includes at least one compound selected from the group consisting of triallyl cyanurate, triallyl isocyanurate, and polybutadiene. When the crosslinking agent contains at least one or more of the compounds described above, the thermosetting composition tends to have even better compatibility between the crosslinking agent and the polyphenylene ether and better coatability, and tends to provide even better board characteristics when mounted on an electronic circuit board.

The mass ratio of the polyphenylene ether to the crosslinking agent (polyphenylene ether:crosslinking agent) is preferably 25:75 to 95:5, more preferably 32:68 to 85:15 from the viewpoint of compatibility between the crosslinking agent and the polyphenylene ether, the coatability of the thermosetting composition, and further superior characteristics of an electronic circuit board mounted.

(Organic Peroxide)

In the present embodiment, any organic peroxide that has the ability to promote the polymerization reaction of the thermosetting composition containing the polyphenylene ether and the crosslinking agent can be used. Examples of the organic peroxides include, for example, peroxides such benzoyl peroxide, cumene hydroperoxide, 2,5-dimethylhexane-2,5-dihydroperoxide, 2,5-dimethyl-2,5-di(t-butylperoxy)hexyne-3, di-t-butyl peroxide, t-butyl cumyl peroxide, di(2-t-butylperoxyisopropyl)benzene, 2,5-dimethyl-2,5-di(t-butylperoxy)hexane, dicumyl peroxide, di-t-butyl peroxyisophthalate, t-butyl peroxybenzoate, 2,2-bis(t-butylperoxy)butane, 2,2-bis(t-butylperoxy)octane, 2,5-dimethyl-2,5-di(benzoylperoxy)hexane, di(trimethylsilyl) peroxide, and trimethylsilyl triphenylsilyl peroxide. Note that a radical initiator such as 2,3-dimethyl-2,3-diphenylbutane can also be used as a reaction initiator for the thermosetting composition. Among them, 2,5-dimethyl-2,5-di(t-butylperoxy)hexyne-3, di(2-t-butylperoxyisopropyl)benzene, and 2,5-dimethyl-2,5-di(t-butylperoxy)hexane are preferred.

The 1-minute half-life temperature of the organic peroxide is preferably 155 to 185° C., more preferably 160 to 180° C., and even more preferably 165 to 175° C. A one-minute half-life temperature of the organic peroxide in the range of 155 to 185° C. tends to further improve the compatibility between the organic peroxide and the polyphenylene ether, the coatability of the thermosetting composition, and the properties of an electronic circuit board mounted.

Note that, in this specification, the one-minute half-life temperature refers to the temperature at which the time duration during which the amount of reactive oxygen species is halved equals one minute as a result of decomposition of the organic peroxide. The one-minute half-life temperature is a value identified by dissolving an organic peroxide in a solvent that is inert to radicals, such as benzene, to a concentration of 0.05 to 0.1 mol/L, and pyrolyzing the organic peroxide solution in a nitrogen atmosphere.

Examples of organic peroxides with a one-minute half-life temperature in the range of 155 to 185° C. include, for example, t-hexyl peroxyisopropyl monocarbonate (155.0° C.), t-butyl peroxy-3,5,5-trimethylhexanoate (166.0° C.), t-butyl peroxy laurate (159.4° C.), t-butyl peroxyisopropyl monocarbonate (158.8° C.), t-butyl peroxy 2-ethylhexyl monocarbonate (161.4° C.), t-hexyl peroxybenzoate (160.3° C.), 2,5-dimethyl-2,5-di(benzoylperoxy)hexane (158.2° C.), t-butyl peroxyacetate (159.9° C.), 2,2-di(t-butylperoxy)butane (159.9° C.), t-butyl peroxybenzoate (166.8° C.), n-butyl 4,4-di(t-butylperoxy)valerate (172.5° C.), di(2-t-butylperoxyisopropyl)benzene (175.4° C.), dicumyl peroxide (175.2° C.), di-t-hexyl peroxide (176.7° C.), 2,5-dimethyl-2,5-di(t-butylperoxy)hexane (179.8° C.), and t-butylcumyl peroxide (173.3° C.).

The content of the organic peroxide is preferably 0.05 parts by mass or more, more preferably 0.5 parts by mass or more, even more preferably 1 parts by mass or more, and still even more preferably 1.5 parts by mass or more, from the viewpoint of excellent compatibility between the organic peroxide and the polyphenylene ether and excellent coatability of the thermosetting composition, based on 100 parts by mass of the sum of the polyphenylene ether and the cross-linking agent. From the viewpoint of superior substrate characteristics when the thermosetting composition is mounted on an electronic circuit board, the content is preferably 5 parts by mass or less, more preferably 4.5 parts by mass or less.

(Thermoplastic Resin)

The thermoplastic resin is preferably at least one selected from the group consisting of block copolymers of a vinyl aromatic compound and an olefinic alkene compound, hydrogenated products thereof (hydrogenated block copolymers obtained through hydrogenation of block copolymers of a vinyl aromatic compound and an olefinic alkene compound), and a homopolymer of a vinyl aromatic compound.

The weight average molecular weight of the thermoplastic resin is preferably more than 50,000 and 780,000 or less, more preferably 60,000 to 750,000, and even more preferably 70,000 to 700,000 from the viewpoint of compatibility with the polyphenylene ether, resin flowability, coatability of the thermosetting composition, heat resistance during curing, and the like.

When the thermosetting composition contains the polyphenylene ether, a crosslinking agent, and an organic peroxide, together with a thermoplastic resin having the types and weight average molecular weights described above, the compatibility between the polyphenylene ether and the other components and the coatability on a base material etc. tend to be improved, which in turn may lead to excellent substrate properties when incorporated into an electronic circuit board.

Note that the weight average molecular weight is determined by gel permeation chromatography (GPC).

The lower limit of the content of units derived from the vinyl aromatic compound in the above block copolymer or the hydrogenated product thereof is preferably 20 mass % or more, and more preferably 22 mass % or more, 24 mass % or more, 26 mass % or more, 28 mass % or more, 30 mass % or more, or 32 mass % or more. The upper limit is preferably 70 mass % or less, more preferably 69 mass % or less, 68 mass % or less, or 67 mass % or less. When the content of units derived from the vinyl aromatic compound in the above block copolymer or the hydrogenated compound thereof is 20 to 70 mass %, the compatibility with the polyphenylene ether is further improved and/or the adhesion strength with a metal foil tends to be further enhanced.

Any vinyl aromatic compound can be used as long as it has an aromatic ring and a vinyl group in the molecule, such as styrene, for example.

Any olefinic alkene compound can be used as long as the compound has a linear or branched structure in the molecule, and examples include ethylene, propylene, butylene, isobutylene, butadiene, and isoprene, for example.

From the viewpoint of further superior compatibility with polyphenylene ether, the thermoplastic resin is preferably at least one selected from the group consisting of styrene-butadiene block copolymers, styrene-ethylene-butadiene block copolymers, styrene-ethylene-butylene block copolymers, styrene-butadiene-butylene block copolymers, styrene-isoprene block copolymers, styrene-ethylene-propylene block copolymers, styrene-isobutylene block copolymers, hydrogenated products of styrene-butadiene block copolymers, hydrogenated products of styrene-ethylene-butadiene block copolymers, hydrogenated products of styrene-butadiene-butylene block copolymers, hydrogenated products of styrene-isoprene block copolymers, and homopolymer of styrene (polystyrene), and is more preferably one or more selected from the group consisting of styrene-butadiene block copolymers, hydrogenated products of styrene-butadiene block copolymers, and polystyrene.

The hydrogenation ratio in the above hydrogenated product is not particularly limited, and a part of carbon-carbon unsaturated double bonds derived from the olefinic alkene compound may remain.

The content of thermoplastic resin is preferably 2 to 20 parts by mass, more preferably 3 to 19 parts by mass, even more preferably 4 to 18 parts by mass, and particularly preferably 5 to 17 parts by mass, based on 100 parts by mass of the sum of the polyphenylene ether and the crosslinking agent. When this content is within the above numerical range, the thermosetting composition of the present embodiment tends to have even better compatibility between the thermoplastic resin and the polyphenylene ether and even better coatability, and tends to provide even better board characteristics when mounted on an electronic circuit board.

The thermosetting composition of the present embodiment may also contain a thermoplastic resin other than the thermoplastic resins having the type and weight average molecular weight described above.

(Flame Retardant)

The thermosetting composition of the present embodiment preferably includes a flame retardant. The flame retardant is not limited as long as it is incompatible with other components included in the thermosetting composition after the thermosetting composition is cured from the viewpoint of enabling improvement in the heat resistance. The flame retardant is preferably incompatible with the polyphenylene ether and/or the crosslinking agent in the thermosetting composition after the thermosetting composition is cured.

Examples of the flame retardant include, for example, inorganic flame retardants such as antimony trioxide, aluminum hydroxide, magnesium hydroxide, and zinc borate; aromatic bromine compounds such as hexabromobenzene, decabromodiphenylethane, 4,4-dibromobiphenyl, and ethylene bis-tetrabromophthalimide; and phosphorus flame retardants such as resorcinol bis-diphenyl phosphate and resorcinol bis-dixylenyl phosphate. One of these flame retardants may be used alone, or two or more of these may be used in combination. Among these, decabromodiphenylethane is preferred as the flame retardant from the viewpoint of compatibility between the flame retardant and the polyphenylene ether, coatability of the thermosetting composition, and further superiority in the characteristics of an electronic circuit board mounted.

The content of the flame retardant is not particularly limited, but from the viewpoint of maintaining the flame retardancy in V-0 level of UL Standard 94, it is preferably 5 parts by mass or more, more preferably 10 parts by mass or more, and even more preferably 15 parts by mass or more with respect to the 100 parts by mass of the sum of the polyphenylene ether resin and the crosslinking agent. From the viewpoint of maintaining the dielectric constant and the dielectric dissipation factor of a resulting cured product low, the content of the flame retardant is preferably 50 parts by mass or less, more preferably 45 parts by mass or less, and even more preferably 40 parts by mass or less.

(Silica Filler)

The thermosetting composition of the present embodiment may contain silica filler. Examples of the silica filler include, for example, natural silica, fused silica, synthetic silica, amorphous silica, aerosil, and hollow silica.

The content of the silica filler may be 10 to 100 parts by mass with respect to 100 parts by mass of the sum of the polyphenylene ether resin and the crosslinking agent. The surface of the silica filler may be subjected to surface treatment with a silane coupling agent or the like.

In addition to the flame retardant and the silica filler, the thermosetting composition of the present embodiment may further contain additives such as heat stabilizers, antioxidants, UV absorbers, surfactants, lubricants, and solvents.

The thermosetting composition of the present embodiment can be in the form of a varnish in which the solid components in the thermosetting composition are dissolved or dispersed in a solvent in the case where a solvent is included, and a resin film can be formed from the thermosetting composition of the present embodiment.

(Solvent)

In view of solubility, preferred solvents are aromatic compounds such as toluene and xylene, methyl ethyl ketone (MEK), cyclopentanone, cyclohexanone, and chloroform. One of these solvents may be used alone, or two or more of these may be used in combination.

<Prepreg>

A prepreg of the present embodiment includes a base material and the thermosetting composition of the present embodiment described above, and is preferably a composite that includes the base material and the thermosetting composition of the present embodiment, where the base material having the thermosetting composition applied on or impregnated with. The prepreg is obtained, for example, by impregnating a base material such as glass cloth with a varnish of the above thermosetting composition, and then drying to remove the solvent content using a hot-air dryer or the like.

Examples of the base material include various types of glass cloth such as roving cloth, cloth, chopped mat, and surfacing mat; synthetic or natural inorganic fiber cloth such as asbestos cloth, metal fiber cloth, and the like; woven or non-woven fabrics made from liquid crystal fibers such as fully aromatic polyamide fibers, fully aromatic polyester fibers, and polybenzoxazole fibers; natural fiber cloth such as cotton cloth, linen cloth, and felt; natural cellulose-based base materials such as carbon fiber cloth, kraft paper, cotton paper, and cloth obtained from paper-glass blend yarn; and porous polytetrafluoroethylene films. Among these, glass cloth is preferable. One of these base materials may be used alone, or two or more of these may be used in combination.

The ratio of the solid contents (components other than solvent of the thermosetting composition) of the thermosetting composition of the present embodiment in the prepreg is preferably 30 to 80 mass %, and more preferably 40 to 70 mass %. When the above ratio is 30 mass % or more, the prepreg tends to have even better insulation reliability when used for an electronic substrate and the like. A above ratio of 80 mass % or less tends to further improve mechanical properties such as bending modulus in applications such as electronic substrates.

<Laminate>

A laminate of the present embodiment includes a cured prepreg of the present embodiment described above and a metal foil, and is preferably a metal clad laminate obtained by laminating the thermosetting composition of the present embodiment or the prepreg of the present embodiment and a metal foil, followed by curing. The metal clad laminate is preferably in the form where a cured product of the prepreg (hereinafter also referred to as "cured product composite") and a metal foil are laminated and adhered together, and is suitably used as a material for electronic substrates.

An aluminum foil and a copper foil are examples of the metal foil. Among these, a copper foil is preferred because the electrical resistance is low.

The number of the cured composite to be combined with the metal foil may be one or more, and a metal foil is laminated on one side or both sides of the composite depending on the application, which is processed into a clad laminate.

A production method of a metal clad laminate includes producing a composite made of a thermosetting composition and a base material (e.g., the prepreg as described above), overlapping the composite with a metal foil, and then curing the thermosetting composition to obtain a clad laminate in which the cured composite and the metal foil are laminated, for example.

One particularly preferred application for the metal clad laminate is printed wiring boards. In the printed wiring board, at least a part of the metal foil is preferably removed from the metal clad laminate.

<Printed Wiring Board>

In a printed wiring board of the present embodiment, at least a part of the metal foil is removed from the metal clad laminate of the present embodiment. The printed wiring board of the present embodiment can typically be formed by performing heat-press molding using the prepreg of the present embodiment described above. The base material may be similar to the base material described above for the prepreg.

Because the printed wiring board of the present embodiment includes the thermosetting composition of the present embodiment, it has excellent heat resistance and electrical properties (low dielectric constant and low dielectric dissipation factor). Further, it can suppress fluctuations of electrical properties caused by environmental changes, and it further has excellent insulation reliability and mechanical properties.

EXAMPLES

Hereinafter, although the present embodiments will be described in more detail with reference to Examples, the present embodiments are not limited to the following Examples.

First, the following describes measurement methods and evaluation criteria for the respective physical properties and evaluations.

(1) Molar Ratio of Repeating Unit Derived from Phenol of Formula (1) or Formula (2) to Sum of Repeating Units Derived from Phenol of Formula (1) and Phenol of Formula (2) Contained in Unmodified Polyphenylene Ether, and Molar Ratio of Structural Unit Derived from Phenol of Formula (3) to Unmodified Polyphenylene Ether Each unmodified polyphenylene ether obtained in Examples and Comparative Example was dissolved in deuterochloroform, and a $^1$H-NMR (manufactured by JEOL Ltd., 500 MHz) measurement was carried out using tetramethylsilane as an internal standard. In the measurement, the unmodified polyphenylene ether was held at 140° C. and 1 mmHg for 8 hours in advance to remove volatile components such as toluene and water, and then the dry unmodified polyphenylene ether was subjected to a measurement. The signals of units derived from phenols of the formula (1), formula (2), and formula (3) were identified and their respective ratios were calculated.

For example, for the unmodified polyphenylene ether obtained in Example 1, the signal derived from the repeating unit derived from a phenol of the formula (1), i.e., the structure derived from 2,6-dimethylphenol (2,6-dimethylphenylene unit), and the signal derived from the repeating unit derived from a phenol of the formula (2), i.e., the structure derived from 2-tert-butyl-5-methylphenol (2-tert-butyl-5-methylphenylene unit), and the signal derived from a phenol of the formula (3), i.e., the structure derived from 2,2-bis(3,5-dimethyl-4-hydroxyphenyl)propane (2,2-bis(3,5-dimethyl-4-hydroxyphenyl)propane unit) were analyzed and attributed as follows. The peaks of the repeating units derived from the phenols appear in the following regions.

Peaks derived from the hydrogen atoms of the methyl group of the 2,6-dimethylphenylene unit, the 2-tert-butyl-5-methylphenylene unit, and the 2,2-bis(3,5-dimethyl-4-hydroxyphenyl)propane unit (6H, 3H, and 18H, respectively): 1.60 to 2.50 ppm (excluding the peak derived from the hydrogen atoms of the methyl group of toluene)

Peak derived from the hydrogen atoms of tert-butyl group of 2-tert-butyl-5-methylphenylene unit (9H): 1.00 to 1.52 ppm (excluding the peak derived from the hydrogen atoms of water)

Peak derived from the hydrogen atoms inside the 2,2-bis(3,5-dimethyl-4-hydroxyphenyl)propane unit (4H): 6.95 to 7.0 ppm By examining the integral values of the above signals, the integral value per proton of the peak derived from the hydrogen atoms of the methyl group of the 2,6-dimethylphenylene unit can be obtained using the following mathematical formula (1).

$$F=\{C-3\times(D/9)-18\times(E/4)\}/6 \quad \text{Mathematical Formula (1)}$$

C: Integral value of the peaks derived from methyl groups of 2,6-dimethylphenylene unit, 2-tert-butyl-5-methylphenylene unit, and 2,2-bis(3,5-dimethyl-4-hydroxyphenyl)propane unit D: Integral value of the peak derived from tert-butyl of 2-tert-butyl-5-methylphenylene unit E: Integral value of the peak derived from the hydrogen atoms inside the 2,2-bis(3,5-dimethyl-4-hydroxyphenyl)propane unit F: Integral value per proton of the peak derived from methyl of the 2,6-dimethylphenylene unit In addition, the ratio (mol %) of repeating units derived from the phenol of the formula (1) or formula (2) to the sum of repeating units derived from the phenol of the formula (1) and repeating units derived from the phenol of the formula (2) can be calculated using the following formulae (2) and (3).

Ratio of repeating units derived from the phenol in the formula (1)

$$(\text{mol }\%)=F/\{(D/9)+F\}\times 100 \quad \text{Mathematical Formula (2)}$$

Ratio of repeating units derived from the phenol in the formula (2)

$$(\text{mol }\%)=(D/9)/\{(D/9)+F\}\times 100 \quad \text{Mathematical Formula (3)}$$

The ratio (mol %) of repeating units derived from the phenol of the formula (3) to the unmodified polyphenylene ether can be calculated using the following formula (4).

Ratio of repeating units derived from the phenol in the formula (3)

$$(mol\ \%) = (E/4)/\{(D/9) + F + (E/4)\} \times 100 \quad \text{Mathematical formula (4)}$$

(2) Molar Ratio of Repeating Unit Derived from Phenol of Formula (1) or Formula (2) to Sum of Repeating Units Derived from Phenol of Formula (1) and Phenol of Formula (2) Contained in Modified Polyphenylene Ether, and Molar Ratio of Structural Unit Derived from Phenol of Formula (3) to Modified Polyphenylene Ether Each modified polyphenylene ether obtained in Examples and Comparative Examples was dissolved in a measurement solvent (deuterochloroform to which 1 drop of deuterated water was added to remove hydroxyl groups), and a $^1$H-NMR (manufactured by JEOL Ltd., 500 MHz) measurement was carried out using tetramethylsilane as an internal standard. In the measurement, the modified polyphenylene ether was held at 140° C. and 1 mmHg for 8 hours in advance to remove volatile components such as toluene and water, and then the dry modified polyphenylene ether was subjected to a measurement. The signals of units derived from phenols of the formula (1), formula (2), and formula (3) were identified and their respective ratios were calculated.

For example, for the modified polyphenylene ether obtained in Example 9, the signal derived from the repeating unit derived from a phenol of the formula (1), i.e., the structure derived from 2,6-dimethylphenol (2,6-dimethylphenylene unit), and the signal derived from the repeating unit derived from a phenol of the formula (2), i.e., the structure derived from 2-tert-butyl-5-methylphenol (2-tert-butyl-5-methylphenylene unit), the signal derived from a phenol of the formula (3), i.e., the structure derived from 2,2-bis(3,5-dimethyl-4-hydroxyphenyl)propane (2,2-bis(3, 5-dimethyl-4-hydroxyphenyl)propane unit), and the signal derived from a partial structure selected from the group consisting of the formula (5), formula (6), formula (7), or formula (8), i.e., the signal derived from structures derived from the methacryl group were analyzed and attributed as follows. The peaks of the repeating units derived from the phenols appear in the following regions.

Peaks derived from the hydrogen atoms of the methyl group of 2,6-dimethylphenylene unit, 2-tert-butyl-5-methylphenylene unit, 2,2-bis(3,5 2,2-bis(3,5-dimethyl-4-hydroxyphenyl)propane unit, and the methacryl group (6H, 3H, 18H, and 3H, respectively): 1.60 to 2.50 ppm (excluding the peak derived from the hydrogen atoms of the methyl group)

Peak derived from the hydrogen atoms of tert-butyl group of 2-tert-butyl-5-methylphenylene unit (9H): 1.00 to 1.52 ppm (excluding the peak derived from the hydrogen atoms of water)

Peak derived from the hydrogen atoms inside the 2,2-bis (3,5-dimethyl-4-hydroxyphenyl)propane unit (4H): 6.85 to 7.0 ppm Peak derived from one hydrogen atom of the methylene group of the methacryl group (1H): 4.4 to 5.8 ppm By examining the integral values of the above signals, the integral value per proton of the peak derived from the hydrogen atoms of the methyl group of the 2,6-dimethylphenylene unit can be obtained using the following formula (5).

$$F = \{C - 3 \times (D/9) - 18 \times (E/4) - 3 \times (H/1)\}/6 \quad \text{Mathematical formula (5)}$$

C: Integral value of the peaks derived from methyl groups of 2,6-dimethylphenylene unit, 2-tert-butyl-5-methylphenylene unit, and 2,2-bis(3,5 2,2-bis(3,5-dimethyl-4-hydroxyphenyl)propane unit D: Integral value of the peak derived from tert-butyl of 2-tert-butyl-5-methylphenylene unit E: Integral value of the peak derived from the hydrogen atoms inside the 2,2-bis(3,5-dimethyl-4-hydroxyphenyl)propane unit F: Integral value per proton of the peak derived from methyl of the 2,6-dimethylphenylene unit H: Integral value of the peak derived from one hydrogen atom of the methylene group of the methacryl group In addition, the ratio (mol %) of repeating units derived from the phenol of the formula (1) or formula (2) to the sum of repeating units derived from the phenol of the formula (1) and repeating units derived from the phenol of the formula (2) can be calculated using the following formulae (6) and (7).

Ratio of repeating units derived from the phenol in the formula (1)

$$(mol\ \%) = F/\{(D/9) + F\} \times 100 \quad \text{Mathematical Formula (6)}$$

Ratio of repeating units derived from the phenol in the formula (2)

$$(mol\ \%) = (D/9)/\{(D/9) + F\} \times 100 \quad \text{Mathematical Formula (7)}$$

In addition, the ratio (mol %) of repeating units derived from the phenol of the formula (3) to the modified polyphenylene ether can be calculated using the following formula (8).

Ratio of repeating units derived from the phenol in the formula (3)

$$(mol\ \%) = (E/4)/\{(D/9) + F + (E/4)\} \times 100 \quad \text{Mathematical formula (8)}$$

(3) Number Average Molecular Weight (Mn)

A calibration curve was prepared based on standard polystyrenes and ethylbenzene using a gel permeation chromatography system (product name: LC2030S) manufactured by Shimadzu Corporation as the measurement apparatus. The number average molecular weight (Mn) of each polyphenylene ether obtained was then determined using the calibration curve.

Standard polystyrenes with molecular weights of 3,650, 000, 2,170,000, 1,090,000, 681,000, 204,000, 52,000, 30,200, 13,800, 3,360, 1,300 and 550 were used.

Two K-805L columns produced by Showa Denko K.K. connected in series were used as the columns. Measurements were performed with a column temperature of 40° C. and using chloroform as a solvent with a solvent flow rate of 1.0 mL/min. A 1-g/L chloroform solution of a polyphenylene ether was prepared as a measurement sample. The UV wavelength of the detector was set as 254 nm for standard polystyrenes and 283 nm for polyphenylene ethers.

The number average molecular weight (Mn) (g/mol) was calculated from the ratio of the peak area based on the curve exhibiting the molecular weight distribution obtained by the GPC based on the above measured data.

(4) Long-Term Solubility to Methyl Ethyl Ketone (Long-Term MEK Solubility)

2 g of polyphenylene ether and 2 g of methyl ethyl ketone were weighed out and placed into a transparent screw tube made of glass. A 50-mass % methyl ethyl ketone solution was prepared by stirring for 1 hour using a stirrer and a magnetic stirrer, and the solution was left to stand at 20° C. for 7 days. An evaluation was made as followed: rated as "0" (good) when the solution remained clear after 7 days, rated as "A" when the solution was partly turbid (the upper part of the solution was clear but the lower part was turbid); or rated "X" (poor) when the entire solution was turbid.

(5) Viscosity (Liquid Viscosity) of Toluene Solution of Polyphenylene Ether 2 g of the polyphenylene ether and 3 g of toluene were weighed out and placed into a transparent screw tube made of glass. A 40-mass % toluene solution was prepared by stirring for 1 hour using a stirrer and a magnetic stirrer. The liquid viscosity of this solution was measured using a B-type viscometer under the conditions of 25° C. and 30 rpm.

(6) Dielectric Properties of Cured Thermosetting Composition

The dielectric properties (dielectric constant and dielectric dissipation factor) of a clad laminate produced in Examples and Comparative examples were measured at 10 GHz by the cavity resonance method. A network analyzer (N5230A, manufactured by Agilent Technologies) and a cavity resonator (Cavity Resornator CP series) manufactured by Kanto Electronics Application & Development Inc. were used as the measurement apparatuses. The clad laminate was cut into a strip of approximately 2 mm in width, 50 mm in length, and 0.5 mm in thickness, so that the warp of the glass cloth coincided with the long sides. Next, the strip was placed in an oven at 105° C.±2° C. for 2 hours for drying, and then allowed to stand in an environment of 23° C. and a relative humidity of 50±5% for 24±5 hours. The dielectric properties (dielectric constant and dielectric dissipation factor) were then measured by using the above measurement apparatuses in an environment of 23° C. and a relative humidity of 50±5%.

Hereinafter, a production method of a polyphenylene ether of each of Examples and Comparative examples will be described.

Example 1

A 1.5-liter jacketed reactor equipped with a sparger for the introduction of an oxygen-containing gas, stirred turbine blades and a baffle at the bottom of the reactor, as well as a refluxing condenser in the vent gas line at the top of the reactor was charged with a pre-prepared mixture of 0.10 g of cuprous oxide and 0.77 g of 47-% hydrobromic acid, along with 0.25 g of N,N'-di-tert-butylethylenediamine, 3.62 g of dimethyl-n-butylamine, 1.19 g of di-n-butylamine, 894 g of toluene, 23.28 g of 2,6-dimethylphenol, 73.03 g of 2-tert-butyl-5-methylphenol, and 3.69 g of 2,2-bis(3,5-dimethyl-4-hydroxyphenyl)propane. Thereafter, simultaneously with start of introduction of air from the sparger at a rate of 1.05 L/minute into the reactor under vigorous stirring, the polymerization temperature was adjusted to be kept to a temperature of 20° C. by flowing the heat medium through the jacket. The air was stopped to be introduced after 150 minutes after the start of introduction of the air, and 1.10 g of ethylenediaminetetraacetic acid tetrasodium salt tetrahydrate (reagent manufactured by Dojindo Laboratories Co., Ltd.) was added to this polymerization mixture as an aqueous solution in 100 g of water. The mixture was then heated to 70° C. and copper extraction was performed at 70° C. for 2 hours. The solution was separated into an unmodified polyphenylene ether solution (organic phase) and an aqueous phase to which the catalyst metal had been transferred, by settled separation. The above organic phase was concentrated by a rotary evaporator until the polymer concentration reached 25 mass %.

The above solution was mixed with methanol with a ratio of methanol to the polymer solution of 6 to precipitate the polymer. Wet polyphenylene ether was obtained by filtration under reduced pressure through a glass filter. The wet polyphenylene ether was further washed with an amount of methanol with a ratio of methanol to the wet polyphenylene ether of 3. This washing operation was performed three times. Then, the wet polyphenylene ether was kept at 140° C. and 1 mmHg for 120 minutes, and a dry polyphenylene ether powder was obtained.

For the obtained polyphenylene ether, measurements were made according to the above-described methods. The result of each analysis is summarized in Table 1.

Example 2

The operations similar to those in Example 1 were carried out, except that 22.00 g of 2,6-dimethylphenol, 69.01 g of 2-tert-butyl-5-methylphenol, and 8.98 g of 2,2-bis(3,5-dimethyl-4-hydroxyphenyl)propane were used as the phenol raw materials.

The result of each analysis is summarized in Table 1.

Example 3

The operations similar to those in Example 1 were carried out, except that 20.00 g of 2,6-dimethylphenol, 62.75 g of 2-tert-butyl-5-methylphenol, and 17.25 g of 2,2-bis(3,5-dimethyl-4-hydroxyphenyl)propane were used as the phenol raw materials.

The result of each analysis is summarized in Table 1.

Example 4

The operations similar to those in Example 1 were carried out, except that 18.16 g of 2,6-dimethylphenol, 56.97 g of 2-tert-butyl-5-methylphenol, and 24.87 g of 2,2-bis(3,5-dimethyl-4-hydroxyphenyl)propane were used as the phenol raw materials.

The result of each analysis is summarized in Table 1.

Example 5

The operations similar to those in Example 1 were carried out, except that 16.72 g of 2,6-dimethylphenol, 52.45 g of 2-tert-butyl-5-methylphenol, and 30.83 g of 1,1-bis(2-methyl-4-hydroxy-5-t-butylphenyl)butane (AO-40 manufactured by ADEKA Corporation) were used as the phenol raw materials.

The result of each analysis is summarized in Table 1.

Example 6

The operations similar to those in Example 1 were carried out, except that 60.99 g of 2,6-dimethylphenol, 9.11 g of 2-tert-butyl-5-methylphenol, and 29.90 g of 1,1,3-tris(2-methyl-4-hydroxy-5-t-butylphenyl)butane (AO-30, manufactured by ADEKA Corporation) were used as the phenol raw materials.

The result of each analysis is summarized in Table 1.

Example 7

The operations similar to those in Example 1 were carried out, except that 25.52 g of 2,6-dimethylphenol, 34.31 g of 2-tert-butyl-5-methylphenol, and 40.18 g of 1,1,3-tris(2-methyl-4-hydroxy-5-t-butylphenyl)butane (AO-30, manufactured by ADEKA Corporation) were used as the phenol raw materials.

The result of each analysis is summarized in Table 1.

Example 8

The operations similar to those in Example 1 were carried out, except that 14.79 g of 2,6-dimethylphenol, 46.40 g of 2-tert-butyl-5-methylphenol, 38.81 g of 1,1,3-tris(2-methyl-4-hydroxy-5-t-butylphenyl)butane (AO-30, manufactured by ADEKA Corporation) were used as the phenol raw materials.

The result of each analysis is summarized in Table 1.

Example 9

The oxidative polymerization, copper extraction, liquid-liquid separation, and concentration using a rotary evaporator were performed in the manner similar to Example 1, and a polymer solution with a polymer concentration of 25 mass % was used as the stock solution for the modification reaction.

A 500-mL three-necked flask equipped with a line for introducing nitrogen gas at the top of the reactor and a reflux condenser in the vent gas line at the top of the reactor was charged with 200 g of an unmodified polyphenylene ether solution and 0.94 g of 4-dimethylaminopyridine after the inside of the reactor was replaced with nitrogen. Under stirring, 43 mL of triethylamine was added using a syringe. Then, 14.9 mL of methacryloyl chloride was measured out in a syringe and dropped into the system at room temperature. The flask was heated in an oil bath for 1 hour after the end of the drop and stirring was continued at 90° C. Thereafter, the flask was further heated in an oil bath and the reaction was continued under reflux. Heating was stopped after 4 hours elapsed since the start of the reflux. After the system returned to normal temperature, 5 g of methanol was added to stop the reaction. The reaction solution was then filtered through a glass filter to obtain a solution from which the byproduced triethylammonium salt was removed. The above solution was mixed with methanol with a ratio of methanol to the polymer solution of 10 to precipitate the polymer. Wet polyphenylene ether was obtained by filtration under reduced pressure through a glass filter. The wet polyphenylene ether was further washed with an amount of methanol with a ratio of methanol to the wet polyphenylene ether of 2.5. This washing operation was performed three times. Then, the wet polyphenylene ether was kept at 100° C. and 1 mmHg for 8 hours, and a dry polyphenylene ether was obtained. A $^1$H NMR measurement confirmed the olefin-derived proton peak of a methacryl group, and it was determined that the hydroxyl group was modified to a methacryl group.

Next, 20 parts by mass of TAIC (manufactured by Nihon Kasei Co. Ltd.) and 1 part by mass of an organic peroxide (PERBUTYL P, manufactured by NOF CORPORATION), to 79 parts by mass of the modified polyphenylene ether were added to toluene, which was stirred and dissolved to obtain a varnish (solid content concentration: 58 mass %). L-glass cloth (style: 2116 manufactured by Asahi Schuebel) was impregnated with the varnish, and excess varnish was scraped off by passing it through a certain slit. The resultant was then dried in a drying oven at 105° C. for a certain time to remove toluene to obtain a prepreg. The prepreg was cut to a predetermined size and the mass of the prepreg was compared against the mass of glass cloth of the same size, so that the solid content of the thermosetting composition in the prepreg was calculated to be 52 mass %.

The obtained prepregs in a predetermined number were laminated and copper foils (GTS-MP foil, manufactured by Furukawa Electric Co., Ltd., thickness: 35 μm) were overlapped on both sides of the laminated prepregs. The laminate was vacuum pressed to obtain a copper clad laminate. In this vacuum pressing step, the following condition was used. The pressure was first set to the 40 kg/cm$^2$ while heating from room temperature at a rate of 2° C./min. After the temperature reached 200° C., the temperature was maintained at 200° C. under a pressure of 40 kg/cm$^2$ and a duration was 60 minutes.

Next, the copper foil of the above copper-clad laminate was etched to obtain a clad laminate (thickness: about 0.5 mm). The dielectric properties of the clad laminate obtained by the aforementioned method were measured.

The result of each analysis is summarized in Table 2.

Example 10

The oxidative polymerization, copper extraction, liquid-liquid separation, and concentration using a rotary evaporator were performed in the manner similar to Example 2, and the resultant was further held at 100° C. and 1 mmHg for 2 hours to obtain a dry polyphenylene ether. Methacrylic modification was performed in the manner similar to Example 9, except that the above dry polyphenylene ether was used as the raw material for the modification reaction, and a clad laminate was prepared and dielectric properties were measured.

The result of each analysis is summarized in Table 2.

Example 11

The oxidative polymerization, copper extraction, liquid-liquid separation, and concentration using a rotary evaporator were performed in the manner similar to Example 3, and the resultant was further held at 100° C. and 1 mmHg for 2 hours to obtain a dry polyphenylene ether. Methacrylic modification was performed in the manner similar to Example 9, except that the above dry polyphenylene ether was used as the raw material for the modification reaction, and a clad laminate was prepared and dielectric properties were measured.

The result of each analysis is summarized in Table 2.

Example 12

The oxidative polymerization, copper extraction, liquid-liquid separation, and concentration using a rotary evaporator were performed in the manner similar to Example 4, and the resultant was further held at 100° C. and 1 mmHg for 2 hours to obtain a dry polyphenylene ether. Methacrylic modification was performed in the manner similar to Example 9, except that the above dry polyphenylene ether was used as the raw material for the modification reaction, and a clad laminate was prepared and dielectric properties were measured.

The result of each analysis is summarized in Table 2.

Example 13

The oxidative polymerization, copper extraction, liquid-liquid separation, and concentration using a rotary evaporator were performed in the manner similar to Example 5, and the resultant was further held at 100° C. and 1 mmHg for 2 hours to obtain a dry polyphenylene ether. Methacrylic modification was performed in the manner similar to Example 9, except that the above dry polyphenylene ether was used as the raw material for the modification reaction, and a clad laminate was prepared and dielectric properties were measured.

The result of each analysis is summarized in Table 2.

Example 14

The oxidative polymerization, copper extraction, liquid-liquid separation, and concentration using a rotary evaporator were performed in the manner similar to Example 6, and the resultant was further held at 100° C. and 1 mmHg for 2 hours to obtain a dry polyphenylene ether. Methacrylic modification was performed in the manner similar to Example 9, except that the above dry polyphenylene ether was used as the raw material for the modification reaction, and a clad laminate was prepared and dielectric properties were measured.

The result of each analysis is summarized in Table 2.

Example 15

The oxidative polymerization, copper extraction, liquid-liquid separation, and concentration using a rotary evaporator were performed in the manner similar to Example 7, and the resultant was further held at 100° C. and 1 mmHg for 2 hours to obtain a dry polyphenylene ether. Methacrylic modification was performed in the manner similar to Example 9, except that the above dry polyphenylene ether was used as the raw material for the modification reaction, and a clad laminate was prepared and dielectric properties were measured.

The result of each analysis is summarized in Table 2.

Example 16

The oxidative polymerization, copper extraction, liquid-liquid separation, and concentration using a rotary evaporator were performed in the manner similar to Example 8, and the resultant was further held at 100° C. and 1 mmHg for 2 hours to obtain a dry polyphenylene ether. Methacrylic modification was performed in the manner similar to Example 9, except that the above dry polyphenylene ether was used as the raw material for the modification reaction, and a clad laminate was prepared and dielectric properties were measured.

The result of each analysis is summarized in Table 2.

Comparative Example 1

The operations similar to those in Example 1 were carried out, except that 79.45 g of 2,6-dimethylphenol and 20.55 g of 2,2-bis(3,5-dimethyl-4-hydroxyphenyl)propane were used as the phenol raw materials.

The result of each analysis is summarized in Table 1.

Comparative Example 2

The operations similar to those in Example 1 were carried out, except that 66.86 g of 2,6-dimethylphenol and 33.14 g of 1,1,3-tris(2-methyl-4-hydroxy-5-t-butylphenyl)butane (AO-30, manufactured by ADEKA Corporation) were used as the phenol raw materials.

The result of each analysis is summarized in Table 1.

Comparative Example 3

The operations similar to those in Example 1 were carried out, except that 55.95 g of 2,6-dimethylphenol and 44.05 g of 1,1,3-tris(2-methyl-4-hydroxy-5-t-butylphenyl)butane (AO-30, manufactured by ADEKA Corporation) were used as the phenol raw materials.

The result of each analysis is summarized in Table 1.

Comparative Example 4

The oxidative polymerization, copper extraction, liquid-liquid separation, and concentration using a rotary evaporator were performed in the manner similar to Comparative Example 1, and the resultant was further held at 100° C. and 1 mmHg for 2 hours to obtain a dry polyphenylene ether. Methacrylic modification was performed in the manner similar to Example 9, except that the above dry polyphenylene ether was used as the raw material for the modification reaction, and a clad laminate was prepared and dielectric properties were measured.

The result of each analysis is summarized in Table 2.

Comparative Example 5

The oxidative polymerization, copper extraction, liquid-liquid separation, and concentration using a rotary evaporator were performed in the manner similar to Comparative Example 2, and the resultant was further held at 100° C. and 1 mmHg for 2 hours to obtain a dry polyphenylene ether. Methacrylic modification was performed in the manner similar to Example 9, except that the above dry polyphenylene ether was used as the raw material for the modification reaction, and a clad laminate was prepared and dielectric properties were measured.

The result of each analysis is summarized in Table 2.

Comparative Example 6

The oxidative polymerization, copper extraction, liquid-liquid separation, and concentration using a rotary evaporator were performed in the manner similar to Comparative Example 3, and the resultant was further held at 100° C. and 1 mmHg for 2 hours to obtain a dry polyphenylene ether. Methacrylic modification was performed in the manner similar to Example 9, except that the above dry polyphenylene ether was used as the raw material for the modification reaction, and a clad laminate was prepared and dielectric properties were measured.

The result of each analysis is summarized in Table 2.

TABLE 1

| | | | Example 1 | Example 2 | Example 3 | Example 4 | Example 5 | Example 6 |
|---|---|---|---|---|---|---|---|---|
| Polymerization composition | Addition ratio of 2,2-bis(3,5-dimethyl-4-hydroxyphenyl) propane | mol % | 2 | 5 | 10 | 15 | — | — |
| | Addition ratio of 1,1-bis(2-methyl-4-hydroxy-5-t-butylphenyl) butane | mol % | — | — | — | — | 15 | — |

TABLE 1-continued

| | | | | | | | | |
|---|---|---|---|---|---|---|---|---|
| | Addition ratio of 1,1,3-tris(2-methyl-4-hydroxy-5-t-butylphenyl) butane | mol % | — | — | — | — | — | 10 |
| | Addition ratio of 2,6-dimethylphenol | mol % | 29 | 28.5 | 27 | 25.5 | 25.5 | 81 |
| | Addition ratio of 2-tert-butyl-5-methylphenol | mol % | 69 | 66.5 | 63 | 59.5 | 59.5 | 9 |
| | Terminal structure | — | OH | OH | OH | OH | OH | OH |
| Analysis of product | Molar ratio of 2-tert-butyl-5-methylphenol unit to the sum of 2,6-dimethylphenol unit and 2-tert-butyl-5-methylphenol unit | mol % | 69 | 70 | 64 | 66 | 69 | 9 |
| | Molar proportion of 2,2-bis(3,5-dimethyl-4-hydroxyphenyl) propane unit to polyphenylene ether | mol % | 2 | 6 | 11 | 15 | 0 | 0 |
| | Molar ratio of 1,1-bis(2-methyl-4-hydroxy-5-t-butylphenyl) butane unit to polyphenylene ether | mol % | 0 | 0 | 0 | 0 | 15 | 0 |
| | Molar ratio of 1,1,3-tris(2-methyl-4-hydroxy-5-t-butylphenyl) butane unit to polyphenylene ether | mol % | 0 | 0 | 0 | 0 | 0 | 10 |
| | Number average molecular weight | g/mol | 1110 | 1970 | 2010 | 1830 | 1460 | 2440 |
| | Long-term MEK solubility (Concentration: 50 mass %, 20° C.) | — | ○ | ○ | ○ | ○ | ○ | ○ |
| | Liquid viscosity of toluene solution (Concentration: 40 mass %, 25° C.) | mPa · s | 31 | 33 | 39 | 32 | 36 | 40 |

| | | | Example 7 | Example 8 | Comp. Ex. 1 | Comp. Ex. 2 | Comp. Ex. 3 |
|---|---|---|---|---|---|---|---|
| Polymerization composition | Addition ratio of 2,2-bis(3,5-dimethyl-4-hydroxyphenyl) propane | mol % | — | — | 10 | — | — |
| | Addition ratio of 1,1-bis(2-methyl-4-hydroxy-5-t-butylphenyl) butane | mol % | — | — | — | — | — |
| | Addition ratio of 1,1,3-tris(2-methyl-4-hydroxy-5-t-butylphenyl) butane | mol % | 15 | 15 | — | 10 | 15 |
| | Addition ratio of 2,6-dimethylphenol | mol % | 42.5 | 25.5 | 90 | 90 | 85 |
| | Addition ratio of 2-tert-butyl-5-methylphenol | mol % | 42.5 | 59.5 | — | — | — |
| | Terminal structure | — | OH | OH | OH | OH | OH |
| Analysis of product | Molar ratio of 2-tert-butyl-5-methylphenol unit to the sum of 2,6-dimethylphenol unit and 2-tert-butyl-5-methylphenol unit | mol % | 47 | 66 | 0 | 0 | 0 |
| | Molar proportion of 2,2-bis(3,5-dimethyl-4-hydroxyphenyl) propane unit to polyphenylene ether | mol % | 0 | 0 | 10 | 0 | 0 |
| | Molar ratio of 1,1-bis(2-methyl-4-hydroxy-5-t-butylphenyl) butane unit to polyphenylene ether | mol % | 0 | 0 | 0 | 0 | 0 |
| | Molar ratio of 1,1,3-tris(2-methyl-4-hydroxy-5-t-butylphenyl) butane unit to polyphenylene ether | mol % | 14 | 15 | 0 | 11 | 15 |
| | Number average molecular weight | g/mol | 1400 | 1980 | 1500 | 1600 | 1200 |
| | Long-term MEK solubility (Concentration: 50 mass %, 20° C.) | — | ○ | ○ | X | Δ | Δ |
| | Liquid viscosity of toluene solution (Concentration: 40 mass %, 25° C.) | mPa · s | 37 | 33 | 59 | 51 | 49 |

TABLE 2

| | | | Example 9 | Example 10 | Example 11 | Example 12 | Example 13 | Example 14 |
|---|---|---|---|---|---|---|---|---|
| Polymerization composition | Addition ratio of 2,2-bis(3,5-dimethyl-4-hydroxyphenyl) propane | mol % | 2 | 5 | 10 | 15 | — | — |
| | Addition ratio of 1,1-bis(2-methyl-4-hydroxy-5-t-butylphenyl) butane | mol % | — | — | — | — | 15 | — |
| | Addition ratio of 1,1,3-tris(2-methyl-4-hydroxy-5-t-butylphenyl) butane | mol % | — | — | — | — | — | 10 |
| | Addition ratio of 2,6-dimethylphenol | mol % | 29 | 28.5 | 27 | 25.5 | 25.5 | 81 |
| | Addition ratio of 2-tert-butyl-5-methylphenol | mol % | 69 | 66.5 | 63 | 59.5 | 59.5 | 9 |
| | Terminal structure | — | Formula (6) | Formula (6) | Formula (6) | Formula (6) | Formula (6) | Formula (6) |
| Analysis of product | Molar ratio of 2-tert-butyl-5-methylphenol unit to the sum of 2,6-dimethylphenol unit and 2-tert-butyl-5-methylphenol unit | mol % | 70 | 70 | 66 | 68 | 71 | 11 |
| | Molar proportion of 2,2-bis(3,5-dimethyl-4-hydroxyphenyl) propane unit to polyphenylene ether | mol % | 2 | 5 | 9 | 14 | 0 | 0 |
| | Molar ratio of 1,1-bis(2-methyl-4-hydroxy-5-t-butylphenyl) butane unit to polyphenylene ether | mol % | 0 | 0 | 0 | 0 | 15 | 0 |
| | Molar ratio of 1,1,3-tris(2-methyl-4-hydroxy-5-t-butylphenyl) butane unit to polyphenylene ether | mol % | 0 | 0 | 0 | 0 | 0 | 9 |
| | Number average molecular weight | g/mol | 1990 | 2200 | 2450 | 3210 | 2980 | 4410 |
| | Long-term MEK solubility (Concentration: 50 mass %, 20° C.) | — | ○ | ○ | ○ | ○ | ○ | ○ |

TABLE 2-continued

| | | | | | | | | |
|---|---|---|---|---|---|---|---|---|
| | Liquid viscosity of toluene solution (Concentration: 40 mass %, 25° C.) | mPa · s | 24 | 24 | 31 | 35 | 29 | 34 |
| Analysis of cured product of thermo-setting | Dielectric constant of cured product of thermosetting composition (@10 GHz) | — | 3.1 | 3.2 | 3.1 | 3.1 | 3.1 | 3.2 |
| | Dielectric dissipation factor of cured product of thermosetting composition (@10 GHz) | — | 0.00288 | 0.00311 | 0.00356 | 0.00344 | 0.00354 | 0.00395 |

| | | | Example 15 | Example 16 | Comp. Ex. 4 | Comp. Ex. 5 | Comp. Ex. 6 |
|---|---|---|---|---|---|---|---|
| Polymerization composition | Addition ratio of 2,2-bis(3,5-dimethyl-4-hydroxyphenyl) propane | mol % | — | — | 10 | — | — |
| | Addition ratio of 1,1-bis(2-methyl-4-hydroxy-5-t-butylphenyl) butane | mol % | — | — | — | — | — |
| | Addition ratio of 1,1,3-tris(2-methyl-4-hydroxy-5-t-butylphenyl) butane | mol % | 15 | 15 | — | 10 | 15 |
| | Addition ratio of 2,6-dimethylphenol | mol % | 42.5 | 25.5 | 90 | 90 | 85 |
| | Addition ratio of 2-tert-butyl-5-methylphenol | mol % | 42.5 | 59.5 | — | — | — |
| | Terminal structure | — | Formula (6) | Formula (6) | Formula (6) | Formula (6) | Formula (6) |
| Analysis of product | Molar ratio of 2-tert-butyl-5-methylphenol unit to the sum of 2,6-dimethylphenol unit and 2-tert-butyl-5-methylphenol unit | mol % | 45 | 63 | 0 | 0 | 0 |
| | Molar proportion of 2,2-bis(3,5-dimethyl-4-hydroxyphenyl) propane unit to polyphenylene ether | mol % | 0 | 0 | 10 | 0 | 0 |
| | Molar ratio of 1,1-bis(2-methyl-4-hydroxy-5-t-butylphenyl) butane unit to polyphenylene ether | mol % | 0 | 0 | 0 | 0 | 0 |
| | Molar ratio of 1,1,3-tris(2-methyl-4-hydroxy-5-t-butylphenyl) butane unit to polyphenylene ether | mol % | 15 | 14 | 0 | 10 | 14 |
| | Number average molecular weight | g/mol | 3270 | 3570 | 2480 | 2530 | 2000 |
| | Long-term MEK solubility (Concentration: 50 mass %, 20° C.) | — | ○ | ○ | X | X | Δ |
| | Liquid viscosity of toluene solution (Concentration: 40 mass %, 25° C.) | mPa · s | 27 | 28 | 54 | 49 | 40 |
| Analysis of cured product of thermo-setting | Dielectric constant of cured product of thermosetting composition (@10 GHz) | — | 3.1 | 3.1 | 3.2 | 3.1 | 3.1 |
| | Dielectric dissipation factor of cured product of thermosetting composition (@10 GHz) | — | 0.00427 | 0.00407 | 0.00413 | 0.00423 | 0.00454 |

As indicated in Table 1 and Table 2, comparisons with the comparative examples prove that polyphenylene ethers with excellent solubility in methyl ethyl ketone and low liquid viscosity in the toluene solution were obtained by using the polyphenylene ethers in the examples.

Furthermore, the clad laminates using the polyphenylene ethers in the examples exhibited superior dielectric properties compared to the clad laminates using the polyphenylene ethers in the comparison examples.

INDUSTRIAL APPLICABILITY

Because the polyphenylene ether of the present disclosure has excellent solvent solubility and a thermosetting composition containing the same has excellent dielectric properties, they are industrially applicable in applications as electronic materials.

The invention claimed is:

1. A polyphenylene ether comprising a repeating unit derived from a phenol of the following formula (1), a repeating unit derived from a phenol of the following formula (2), and a structural unit derived from a phenol of the following formula (3):

[Chem. 1]

Formula (1)

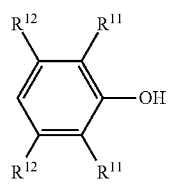

(in the formula (1), each $R^{11}$ is independently an optionally substituted saturated hydrocarbon group having a carbon number of 1 to 6, an optionally substituted aryl group having a carbon number of 6 to 12, or a halogen atom, and each $R^{12}$ is independently a hydrogen atom, an optionally substituted hydrocarbon group having a carbon number of 1 to 6, an optionally substituted aryl group having a carbon number of 6 to 12, or a halogen atom):

[Chem. 2]

Formula (2)

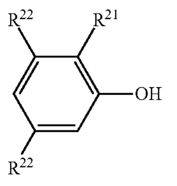

(in the formula (2), each $R^{22}$ is independently a hydrogen atom, an optionally substituted saturated or unsaturated hydrocarbon group having a carbon number of 1 to 20, an optionally substituted aryl group having a carbon number of 6 to 12, or a halogen atom, two $R^{22}$ cannot be both hydrogen atoms, and $R^{21}$ is a partial structure represented by the following formula (4):

[Chem. 3]

Formula (3)

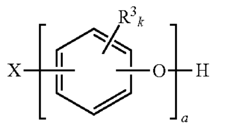

(in the formula (3), X is any a-valent linking group, a is an integer from 2 to 6, $R^3$ is one of a linear alkyl group having a carbon number of 1 to 8 and a partial structure represented by the following formula (4), and is bonded to the carbon atom of at least one of Position 2 or Position 6 when the position of the carbon atom of the benzene ring to which —O— is bonded is designated as Position 1, and k is each independently an integer from 1 to 4):

[Chem. 4]

Formula (4)

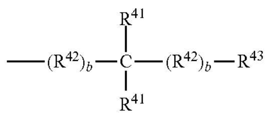

(in the formula (4), $R^{41}$ is each independently an optionally substituted linear alkyl group having a carbon number of 1 to 8, or is a cyclic alkyl structure having a carbon number of 1 to 8 to which two $R^{41}$ are bonded, each $R^{42}$ is independently an optionally substituted alkylene group having a carbon number of 1 to 8, b is each independently 0 or 1, $R^{43}$ is one of a hydrogen atom, an optionally substituted alkyl group having a carbon number of 1 to 8, or an optionally substituted phenyl group), and the partial structure represented by the formula (4), which is $R^{21}$ in the formula (2), and the partial structure represented by the formula (4) in $R^3$ in the formula (3) may be the same or different.

2. The polyphenylene ether according to claim 1, wherein $R^{21}$ is a t-butyl group in at least one repeating unit derived from the phenol of the formula (2).

3. The polyphenylene ether according to claim 1, wherein at least one $R^3$ in the formula (3) is a t-butyl group.

4. The polyphenylene ether according to claim 1, wherein the polyphenylene ether has at least one partial structure selected from the group consisting of the following formula (5), formula (6), formula (7), and formula (8):

[Chem. 5]

Formula (5)

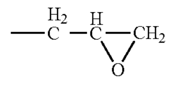

[Chem. 6]

Formula (6)

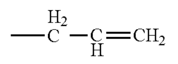

[Chem. 7]

Formula (7)

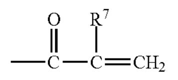

(in the formula (7), $R^7$ is a hydrogen atom or a saturated or unsaturated hydrocarbon group having a carbon number of 1 to 10, the saturated or unsaturated hydrocarbon may have a substituent to the extent that the condition of the carbon number being 1 to 10 is satisfied):

[Chem. 8]

Formula (8)

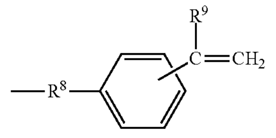

(in the formula (8), $R^8$ is a saturated or unsaturated divalent hydrocarbon group having a carbon number of 1 to 10, the saturated or unsaturated divalent hydrocarbon may have a substituent to the extent that the condition of the carbon number being 1 to 10 is satisfied, $R^9$ is a hydrogen atom or a saturated or unsaturated hydrocarbon group having a carbon number of 1 to 10, and the saturated or unsaturated hydrocarbon may have a substituent to the extent that the condition of the carbon number being 1 to 10 is satisfied).

5. The polyphenylene ether according to claim 1, wherein a number average molecular weight in terms of polystyrene is from 500 to 15,000.

6. A production method of the polyphenylene ether according to claim 1, comprising the step of performing oxidative polymerization of the phenol of the formula (1), the phenol of the formula (2), and the phenol of the formula (3).

7. A thermosetting composition comprising the polyphenylene ether according to claim 1.

8. A prepreg, the prepreg being a composite comprising a base material and a thermosetting composition according to claim 7.

9. The prepreg according to claim 8, wherein the base material is glass cloth.

10. A laminate comprising a cured product of the prepreg according to claim 8 and a metal foil.

11. The polyphenylene ether according to claim 2, wherein at least one $R^3$ in the formula (3) is a t-butyl group.

12. The polyphenylene ether according to claim 2, wherein the polyphenylene ether has at least one partial structure selected from the group consisting of the following formula (5), formula (6), formula (7), and formula (8):

[Chem. 9]

Formula (5)

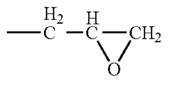

[Chem. 10]

Formula (6)

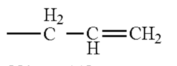

[Chem. 11]

Formula (7)

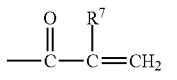

(in the formula (7), $R^7$ is a hydrogen atom or a saturated or unsaturated hydrocarbon group having a carbon number of 1 to 10, the saturated or unsaturated hydrocarbon may have a substituent to the extent that the condition of the carbon number being 1 to 10 is satisfied):

[Chem. 12]

Formula (8)

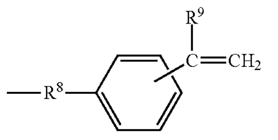

(in the formula (8), $R^8$ is a saturated or unsaturated divalent hydrocarbon group having a carbon number of 1 to 10, the saturated or unsaturated divalent hydrocarbon may have a substituent to the extent that the condition of the carbon number being 1 to 10 is satisfied, $R^9$ is a hydrogen atom or a saturated or unsaturated hydrocarbon group having a carbon number of 1 to 10, and the saturated or unsaturated hydrocarbon may have a substituent to the extent that the condition of the carbon number being 1 to 10 is satisfied).

13. The polyphenylene ether according to claim 2, wherein a number average molecular weight in terms of polystyrene is from 500 to 15,000.

14. A production method of the polyphenylene ether according to claim 2, comprising the step of performing oxidative polymerization of the phenol of the formula (1), the phenol of the formula (2), and the phenol of the formula (3).

15. A thermosetting composition comprising the polyphenylene ether according to claim 2.

16. A laminate comprising a cured product of the prepreg according to claim 9 and a metal foil.

17. A prepreg, the prepreg being a composite comprising a base material and a thermosetting composition according to claim 15.

18. The prepreg according to claim 17, wherein the base material is glass cloth.

19. A laminate comprising a cured product of the prepreg according to claim 17 and a metal foil.

20. A laminate comprising a cured product of the prepreg according to claim 18 and a metal foil.

* * * * *